US008878789B2

(12) United States Patent
Murphy

(10) Patent No.: US 8,878,789 B2
(45) Date of Patent: *Nov. 4, 2014

(54) CHARACTER SPECIFICATION SYSTEM AND METHOD THAT USES A LIMITED NUMBER OF SELECTION KEYS

(71) Applicant: Michael William Murphy, Bellingham, WA (US)

(72) Inventor: Michael William Murphy, Bellingham, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/917,566

(22) Filed: Jun. 13, 2013

(65) Prior Publication Data

US 2013/0278506 A1  Oct. 24, 2013

Related U.S. Application Data

(63) Continuation of application No. 12/813,305, filed on Jun. 10, 2010, now Pat. No. 8,487,877.

(51) Int. Cl.
    *G06F 3/02* (2006.01)
    *G06F 3/023* (2006.01)
    *G06F 3/0489* (2013.01)

(52) U.S. Cl.
    CPC ............... *G06F 3/02* (2013.01); *G06F 3/0233* (2013.01); *G06F 3/0489* (2013.01)
    USPC .......................................... 345/169; 345/157

(58) Field of Classification Search
    USPC ................... 345/156–173; 707/759; 715/773; 341/22; 704/1
    See application file for complete search history.

(56) References Cited

U.S. PATENT DOCUMENTS

| | | |
|---|---|---|
| 4,481,508 A | 11/1984 | Kamei et al. |
| 6,011,542 A | 1/2000 | Durrani et al. |
| 6,765,556 B2 | 7/2004 | Kandogan et al. |
| 6,799,303 B2 | 9/2004 | Blumberg |
| 7,218,249 B2 | 5/2007 | Chadha |
| 7,256,769 B2 | 8/2007 | Pun et al. |
| 7,382,358 B2 | 6/2008 | Kushler et al. |
| 7,424,683 B2 | 9/2008 | Van Leeuwen |
| 7,555,732 B2 | 6/2009 | Van der Hoeven |
| 7,793,228 B2 | 9/2010 | Mansfield et al. |
| 8,011,542 B2 | 9/2011 | Gandy et al. |
| 2005/0060138 A1* | 3/2005 | Wang et al. ...................... 704/1 |
| 2006/0066583 A1 | 3/2006 | Toutonghi et al. |
| 2006/0116135 A1 | 6/2006 | Ure |
| 2006/0119582 A1 | 6/2006 | Ng et al. |
| 2006/0202865 A1 | 9/2006 | Nguyen |
| 2008/0291059 A1* | 11/2008 | Longe ............................ 341/22 |
| 2008/0316065 A1 | 12/2008 | Maber |
| 2010/0257478 A1* | 10/2010 | Longe et al. .................. 715/773 |
| 2010/0271241 A1 | 10/2010 | Weller |
| 2011/0032200 A1 | 2/2011 | Park et al. |
| 2013/0120274 A1 | 5/2013 | Ha et al. |

* cited by examiner

*Primary Examiner* — Quan-Zhen Wang
*Assistant Examiner* — Yuk Chow
(74) *Attorney, Agent, or Firm* — Seed IP Law Group PLLC

(57) ABSTRACT

A method and apparatus of identifying and selecting characters from among a plurality of characters. In accordance with one embodiment of the invention, a computer processor electronically enables identification of each of a plurality of characters arranged in a one-dimensional array. Each character is identified by an integer value that corresponds to the number of positions the character is offset from a reference position of the one-dimensional array. The computer processor electronically enables selection of any of the characters by receiving input resulting from activation of selection keys that specify the integer value of a character desired for selection. In one further embodiment, each selection key has an assigned integer value, and the integer value that identifies the selected character is calculated by summing the assigned integer values of each selection key activated for each instance that each selection key is activated within a selectable-length time period.

28 Claims, 37 Drawing Sheets

Number of selection buttons: 4
Assigned integer values: -3, -2, +2, +3

| Combination No. | Value of first button pressed | Value of second button pressed | Integer value |
|---|---|---|---|
| 1 | -3 | -3 | -6 |
| 2 | -3 | -2 | -5 |
| 3 | -2 | -2 | -4 |
| 4 | -3 | - | -3 |
| 5 | -2 | - | -2 |
| 6 | -3 | +2 | -1 |
| 7 | -3 | +3 | 0 |
| 8 | +3 | -2 | +1 |
| 9 | +2 | - | +2 |
| 10 | +3 | - | +3 |
| 11 | +2 | +2 | +4 |
| 12 | +3 | +2 | +5 |
| 13 | +3 | +3 | +6 |

*FIG.12*

Number of selection buttons: 4
Assigned integer values: -3, -1, +1, +3

| Combination No. | Value of first button pressed | Value of second button pressed | Value of third button pressed | Integer value |
|---|---|---|---|---|
| 1 | -3 | -3 | - | -6 |
| 2 | -3 | -1 | -1 | -5 |
| 3 | -3 | -1 | - | -4 |
| 4 | -3 | - | - | -3 |
| 5 | -1 | -1 | - | -2 |
| 6 | -1 | - | - | -1 |
| 7 | -3 | +3 | - | 0 |
| 8 | +1 | - | - | +1 |
| 9 | +1 | +1 | - | +2 |
| 10 | +3 | - | - | +3 |
| 11 | +3 | +1 | - | +4 |
| 12 | +3 | +1 | +1 | +5 |
| 13 | +3 | +3 | - | +6 |

*FIG.13*

Number of selection buttons: 3
Assigned integer values: +2, +3, +5

| Combination No. | Value of first button pressed | Value of second button pressed | Value of third button pressed | Integer value |
|---|---|---|---|---|
| 1 | +2 | - | - | +2 |
| 2 | +3 | - | - | +3 |
| 3 | +2 | +2 | - | +4 |
| 4 | +5 | - | - | +5 |
| 5 | +2 | +3 | - | +6 |
| 6 | +2 | +2 | +2 | +8 |
| 7 | +3 | +3 | - | +9 |
| 8 | +2 | +5 | - | +10 |

*FIG. 14*

Number of selection buttons: 4
Assigned integer values: -1, +2, +3, +5

| Combination No. | Value of first button pressed | Value of second button pressed | Value of third button pressed | Value of fourth button pressed | Integer value |
| --- | --- | --- | --- | --- | --- |
| 1 | +2 | +5 | -1 | - | -10 |
| 2 | +3 | +3 | -1 | - | -9 |
| 3 | +2 | +2 | +2 | -1 | -8 |
| 4 | +2 | +3 | -1 | - | -6 |
| 5 | +5 | -1 | - | - | -5 |
| 6 | +2 | +2 | -1 | - | -4 |
| 7 | +3 | -1 | - | - | -3 |
| 8 | +2 | -1 | - | - | -2 |
| 9 | -1 | - | - | - | -1 |
| 10 | -1 | -1 | - | - | +1 |
| 11 | +2 | - | - | - | +2 |
| 12 | +3 | - | - | - | +3 |
| 13 | +2 | +2 | - | - | +4 |
| 14 | +5 | - | - | - | +5 |
| 15 | +2 | +3 | - | - | +6 |
| 16 | +2 | +2 | +2 | - | +8 |
| 17 | +3 | +3 | - | - | +9 |
| 18 | +2 | +5 | - | - | +10 |

*FIG.16*

Number of selection buttons: 5
Assigned integer values: -1, +2, +3, +5, +7

| Combination No. | Value of first button pressed | Value of second button pressed | Value of third button pressed | Value of fourth button pressed | Integer value |
|---|---|---|---|---|---|
| 1 | +2 | +5 | -1 | - | -10 |
| 2 | +3 | +3 | -1 | - | -9 |
| 3 | +2 | +2 | +2 | -1 | -8 |
| 4 | +7 | -1 | - | - | -7 |
| 5 | +2 | +3 | -1 | - | -6 |
| 6 | +5 | -1 | - | - | -5 |
| 7 | +2 | +2 | -1 | - | -4 |
| 8 | +3 | -1 | - | - | -3 |
| 9 | +2 | -1 | - | - | -2 |
| 10 | -1 | - | - | - | -1 |
| 11 | -1 | -1 | - | - | +1 |
| 12 | +2 | - | - | - | +2 |
| 13 | +3 | - | - | - | +3 |
| 14 | +2 | +2 | - | - | +4 |
| 15 | +5 | - | - | - | +5 |
| 16 | +2 | +3 | - | - | +6 |
| 17 | +7 | - | - | - | +7 |
| 18 | +2 | +2 | +2 | - | +8 |
| 19 | +3 | +3 | - | - | +9 |
| 20 | +2 | +5 | - | - | +10 |

*FIG.18*

| Speed Rank | Categories of keystroke combinations | Example keystroke combinations | | | | Orient-ation |
|---|---|---|---|---|---|---|
| | | A | B | C | D | |
| 1 | Single click of single button | -3 | -2 | +2 | +3 | Fastest |
| 2 | Single click of two buttons using different thumbs | -3, +2 | -3, +3 | -2, +2 | -2, +3 | |
| 3 | Double click of single button | -3, -3 | -2, -2 | +2, +2 | +3, +3 | |
| 4 | Single click of two buttons using the same thumb | -3, -2 | +2, +3 | | | Slowest |

FIG.23

| Letter | Frequency of Use in the English Language |
|:---:|:---:|
| e | 12.70% |
| t | 9.06% |
| a | 8.17% |
| o | 7.51% |
| i | 6.97% |
| n | 6.75% |
| s | 6.33% |
| h | 6.09% |
| r | 5.99% |
| d | 4.25% |
| l | 4.03% |
| c | 2.78% |
| u | 2.76% |
| m | 2.41% |
| w | 2.36% |
| f | 2.23% |
| g | 2.02% |
| y | 1.97% |
| p | 1.93% |
| b | 1.49% |
| v | 0.98% |
| k | 0.77% |
| j | 0.15% |
| x | 0.15% |
| q | 0.10% |
| z | 0.07% |

CHARACTER SPECIFICATION SYSTEM AND METHOD THAT USES A LIMITED NUMBER OF SELECTION KEYS

BACKGROUND

1. Technical Field

This description generally relates to the field of electronic devices and, more particularly, to user interfaces of electronic devices.

2. Description of the Related Art

Electronic devices often require entry of data in the form of words, sentences, letters, numbers, characters and symbols by a user in order to perform their designed functions. A typical character entry interface that meets this requirement provides a plurality of buttons, each sized to be easily pressed by a human fingertip, with one character assigned to each button and one button for each character that a user could want to select. In English-language cultures, the QWERTY keyboard is one such standard interface and this interface is commonly found on typewriters and computers.

Some electronic devices, either by design or due to a constraint, do not use the standard interface. Portable electronic devices are an example of an entire category of electronic devices that do not typically provide a standard character entry interface. Users of portable devices typically demand that the device fit easily in a pocket or purse. To meet this requirement, portable devices cannot at the same time offer finger-sized keys and enough keys for all the letters of an alphabet. As many portable devices have functions that require character entry, this leads to a conflict between providing a user interface that offers complete and convenient functionality but in a size that can still be carried inside a user's pocket. Many alternative methods for solving this conflict exist in the prior art, as will be discussed below.

In FIG. 1 a cellular phone is shown having a character entry interface and method known in the prior art. The interface includes twelve physical buttons in a 3×4 matrix on a front face of the phone. Ten of the twelve buttons are assigned a numeral, one numeral per button. Eight buttons are also assigned text characters, three characters per button. Both the numerical and text character assignments are indicated on the face of the button. Characters are selected by first choosing a mode—numeral or text character—that identifies which category of character becomes entered by pressing the button. Within text mode, the particular character entered of the three displayed on a given button face is differentiated by the number of times the button is pressed during a given period.

For example, in FIG. 1 the button in the top row middle column of the interface is assigned the numeral 2 and the text characters a, b, and c. According to the method, while in text mode a user presses the button one time to indicate the character a for selection. To indicate character b for selection, the user presses the button two consecutive times. Similarly, the user presses the button three consecutive times to indicate character c for selection. Sequences of characters that can form words and sentences are indicated by consecutively pressing the appropriate physical button the appropriate number of button presses for each subsequent character in the desired word or sentence. This interface and method are well-known in the art and has the advantage of being compact in size; however, the method has the disadvantage of being slow compared with a standard interface due to the number of button presses required to enter many of the text characters.

In FIG. 2 a character entry interface and method similar to the one shown in FIG. 1 is shown. The method is essentially identical to the one shown in FIG. 1. The interface is different in that the buttons are soft keys, meaning that the buttons are graphically represented on changeable display, rather than physical buttons. An advantage of this interface is that it is configurable, because the graphical representation of the keys can be changed on the display. Therefore, the assignment of characters to buttons, the arrangement of the keys, and the overall size of the interface are variable. The method, however, still has the disadvantage of being slow compared with a standard interface due to the number of button presses needed to enter many of the text characters.

In FIG. 3 another user interface and text entry method known in the art is shown. This interface has thirty keys distributed among three rows, ten keys per row. This interface provides enough buttons that every character of a typical alphabet has its own key. Numeric characters still share keys with a text character, therefore a selection between numeric and text mode is still required. The method of indicating characters for selection is straightforward in that a character is indicated by simply pressing the button that displays the desired character on the button face. This method offers the advantage of faster text entry speeds because multiple character presses are not needed to select any of the characters. A disadvantage of the interface is that to meet size constraints the buttons are small relative to a typical user's fingertip. This leads to slower and less accurate character entry compared with a standard interface.

In FIG. 4 a character entry interface and method similar to the one shown in FIG. 3 is shown. The method is essentially identical to the one shown in FIG. 3. The interface is different in that the buttons are soft keys, rather than physical buttons. Like the interface of FIG. 3, this interface provides enough buttons that every character of a typical alphabet has its own key. Characters are indicated for selection by simply pressing the soft key that displays the desired character. An advantage of this interface over the one of FIG. 3 is that panels of various keys can be exchanged, for example the displayed panel of text characters can be exchanged for a panel of numeric characters. While this interface offers improved configurability over the interface of FIG. 3, the disadvantages of that interface, such as the small buttons relative to the size of a user's fingertips, still exist. A further disadvantage of this interface, and one shared with the interface of FIG. 2, is that soft keys provide no tactile feel to the user. A user cannot tactilely distinguish if their finger is on a key or between keys, therefore this interface requires that a user either visually align their finger with the desired button or verify that the desired character was selected by visually checking a display.

In FIG. 5 a variation on the interface of FIG. 4 is shown. The method of FIG. 5 is essentially identical to the ones shown in FIGS. 3 and 4, however the interface rearranges the buttons, and the assignments of the text characters to the buttons, so that the most frequently used characters of a language are assigned next to one another and close to the center of the interface. For example, the commonly used characters of a, e, s, t, r, and o are assigned to buttons at the center of the interface. On the other hand, the less frequently characters of z, k, x, and q are placed at the corners. This arrangement speeds up character entry by minimizing the time required for a user to move fingers between keys because the most frequently used keys are located close to one another. This improvement highlights one disadvantage that all the character entry interfaces share in common—one or two-finger character entry compared with eight-finger entry on a standard QWERTY interface.

In FIG. 6 yet another character entry interface and method known in the art is shown. This interface uses a stylus and a touch-sensitive display screen. A user traces out shapes or symbols that represent characters directly on the display screen. The electronic device is equipped to interpret and recognize the shapes and associate each unique shape with a different text or numerical character. Shapes traced out on the display screen are interpreted as separate characters based on when the stylus is lifted off on and then placed back on the display screen. Typically the user may trace character shapes out anywhere on the display screen and as long as the electronic device is in a mode to receive and interpret these shapes, the shape will be interpreted and the indicated character understood. As an example, a user may have a note-taking application opened and shown on the display of their electronic device. A user places the tip of the stylus on the display and, if they desire to enter the character a, traces a first line segment diagonally upward and to the right on the display screen, followed by a second line segment straight downward on the screen from the end of the first line segment. Once the user picks the stylus up off the screen, the device seeks to interpret the shape, associate it with a particular character, and if recognizable, enter the indicated character a in the note-taking application. A character is interpreted for each continuous stroke of the stylus along the display screen. This interface has an advantage in that no display of a selection character or buttons is required at all, however the method has the disadvantages of requiring the user to trace out characters rather than pressing buttons and to learn the shapes that associated with each character.

In FIG. 7 still another character entry interface and method known in the art is shown. This interface includes a two-stage display, a first stage that displays all the characters available for selection and a second stage that displays a portion of the first stage in a zoom-in view. In the first stage, the available characters are displayed in a single row. A frame lies over the displayed characters and surrounds a portion of the characters. Whatever characters are within the frame are displayed in the second stage, except of a size much larger than displayed in the first frame. The frame is moveable along the row of characters and as characters enter or leave the frame by its movement, the characters shown in the second stage also correspondingly change. The second frame also includes selection buttons on which the characters in the frame are shown. A user indicates a character for selection by pressing the selection button displaying the desired character. If the desired character is not displayed, the user slides the frame in the first stage to cause the desired character to be shown in the second frame, and then presses the appropriate button to indicate the character for selection. An advantage of the interface is that the selection buttons can be made large because there are selection buttons for only a few characters at any one time. The large buttons make the method highly accurate, but a disadvantage is that two different operations must be conducted per character indicated: first moving the frame along the row of characters to display the desired character, and second actually pressing the button displaying the desired character. The two steps make the speed of the method slow compared with any of the others.

BRIEF SUMMARY

The present invention provides a method of identifying and selecting characters from among a plurality of characters.

In accordance with one embodiment of the invention, a computer processor electronically enables identification of each of a plurality of characters arranged in a one-dimensional array. Each character is identified by an integer value that corresponds to the number of positions the character is offset from a reference position of the one-dimensional array. The computer processor electronically enables selection of any of the characters of the array by receiving input resulting from one or two activations of a selection key, or activation of a pair of selection keys. The activation of the selection key or keys specifies the integer value that identifies a character desired for selection.

In accordance with a further embodiment of the invention, each selection key has an assigned integer value, and the integer value that identifies a selected character is calculated by summing the assigned integer values of each selection key activated for each instance that each selection key is activated within a selectable-length time period.

In accordance with still a further embodiment of the invention, the computer processor electronically displays the characters arranged in the one-dimensional array on a display of a device.

In accordance with another embodiment of the invention, the one-dimensional array has thirteen characters and the received input results from activation of at least one of four selection keys.

In accordance with another embodiment of the invention, the assigned integer values of the four selection keys are −3, −2, +2, and +3.

In accordance with another embodiment of the invention, the assigned integer values of the four selection keys are −3, −1, +1, and +3.

In accordance with another embodiment of the invention, the plurality of characters is distributed amongst two or more one-dimensional arrays, each array having an associated set of selection keys.

In accordance with another embodiment of the invention, the plurality of characters is distributed amongst two or more one-dimensional arrays having thirteen characters each.

In accordance with a further embodiment of the invention, the characters of the one-dimensional array are arranged according to their frequency of use and the relative speed with which keystroke combinations can be executed by a user relative to other keystroke combinations.

In accordance with yet a further embodiment of the invention, more frequently used characters are in positions of the one-dimensional array associated with faster selection key keystroke combinations and less frequently used characters are in positions of the one-dimensional array associated with slower selection key keystroke combinations.

In accordance with another embodiment of the invention, the computer. processor automatically displays the selected character on a display of the device.

In accordance with a further embodiment of the invention, the computer processor electronically enables successive identification and selection of the characters of the one or more one-dimensional arrays over a series of selectable-length time periods. In a still further embodiment, the characters accrue on the display to form words.

In accordance with another embodiment of the invention, each selection key has an assigned integer value, and the integer value that identifies a selected character is calculated by multiplying the assigned integer values of each selection key activated for each instance that each selection key is activated within a selectable-length time period.

In accordance with another embodiment of the invention, the one-dimensional array has eight characters, the received input results from activation of at least one of three selection keys, and the assigned integer values of the three selection keys are +2, +3, and +5.

In accordance with another embodiment of the invention, the one-dimensional array has eighteen characters, the received input results from activation of at least one of four selection keys, and the assigned integer values of the four selection keys are −1, +2, +3, and +5.

In accordance with another embodiment of the invention, the one-dimensional array has twenty characters, the received input results from activation of at least one of five selection keys, and the assigned integer values of the five selection keys are −1, +2, +3, +5 and +7.

The present invention also discloses an electronic apparatus that includes (1) a case having a display, (2) a plurality of selection keys arranged on a front face of the case or the display, each selection key having an assigned integer value that enables selection of any of a plurality of characters of a one-dimensional array by one or two activations of one selection key of the plurality of selection keys, or activation of a pair of selection keys of the plurality of selection keys, each character identified by the number of positions the character is offset from a reference position of the one-dimensional array; and (3) a processor inside the case, the display and the plurality of selection keys in electrical communication with the processor.

In accordance with a further embodiment of the invention, the electronic apparatus further includes two or more one-dimensional arrays of at least four unique characters each displayed on the front face of the case or the display, each of the plurality of selection keys associated with one of the two or more one-dimensional arrays.

In accordance with a further embodiment of the invention, each of the plurality of selection keys is oriented along an axis that lies lengthwise with the one-dimensional array of characters that each selection key is associated.

In accordance with still a further embodiment of the invention, the electronic apparatus further includes a reference feature located on or near one of the one-dimensional arrays, and a scale oriented parallel to one of the one-dimensional arrays that includes a zero value at a position corresponding to the reference feature.

In accordance with another embodiment of the invention, the plurality of characters are distributed amongst two one-dimensional arrays having thirteen characters each and the number of selection keys associated with each one-dimensional array is four.

In accordance with another embodiment of the invention, the assigned integer values of the four selection keys are −3, −2, +2, and +3.

In accordance with another embodiment of the invention, the assigned integer values of the four selection keys are −3, −1, +1, and +3.

In accordance with yet another embodiment of the invention, a plurality of selection keys associated with a one-dimensional array is combined into one multiple-function button.

In accordance with yet another embodiment of the invention, the display and the plurality of selection keys are located remotely from one another.

The present invention also discloses a computer readable storage medium having computer executable instructions that electronically enables (1) identification of any of a plurality of characters arranged in a one-dimensional array, each character identified by an integer value equal to the number of positions that the character is offset from a reference position of the one-dimensional array, and (2) selection of any of the characters of the one-dimensional array by receiving input resulting from one or two activations of one selection key, or activation of a pair of selection keys, the activation of the one or pair of selection keys specifying the integer value that identifies a selected character.

In accordance with another embodiment of the invention, each selection key has an assigned integer value, and the integer value that identifies the selected character is calculated by a computer processor by summing or multiplying the assigned integer values of each activated selection key for each instance that each selection key is activated within a selectable-length time period.

In accordance with another embodiment of the invention, the characters of the one-dimensional array are arranged according to their frequency of use and the relative speed with which keystroke combinations can be executed by a user relative to other keystroke combinations.

BRIEF DESCRIPTION OF THE SEVERAL VIEWS OF THE DRAWINGS

FIG. 12 illustrates a setup in accordance with one embodiment of the invention.

FIG. 13 illustrates a setup in accordance with another embodiment of the invention.

FIG. 14 illustrates a setup in accordance with still another embodiment of the invention.

FIG. 16 illustrates a setup in accordance with still another embodiment of the invention.

FIG. 18 illustrates a setup in accordance with yet another embodiment of the invention.

FIG. 23 illustrates a table of selection key keystroke combinations in accordance with one embodiment of the invention.

FIG. 24 illustrates a table of the frequency of use of individual letters of the English language.

FIG. 26 illustrates a user interface in accordance with still another embodiment of the invention.

FIG. 28 illustrates a user interface in accordance with still another embodiment of the invention.

DETAILED DESCRIPTION

Figure 1:
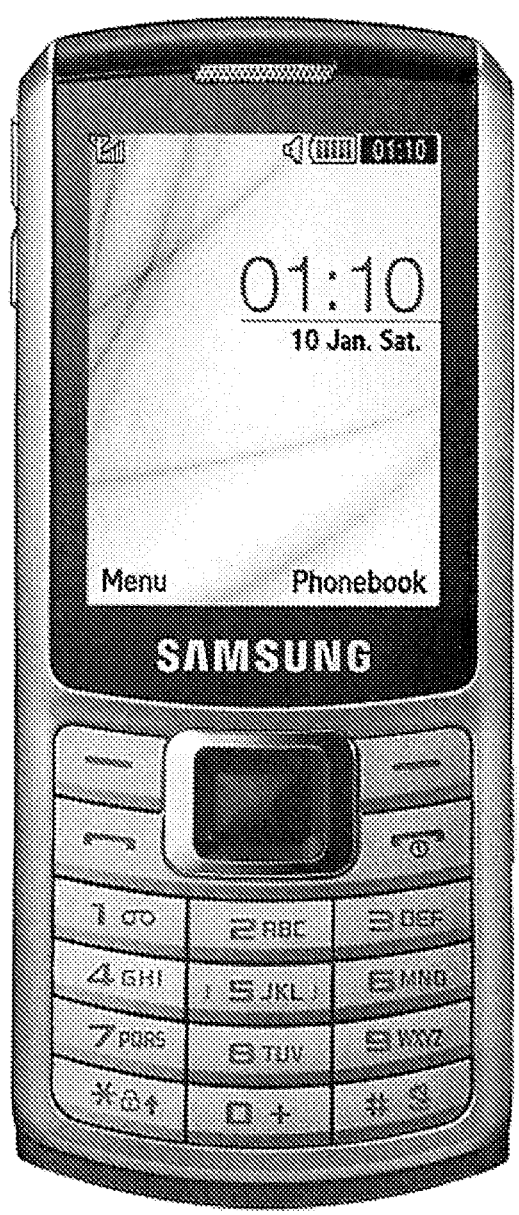
FIGS. 1-7 illustrate electronic devices consistent with the prior art.
Figure 2:
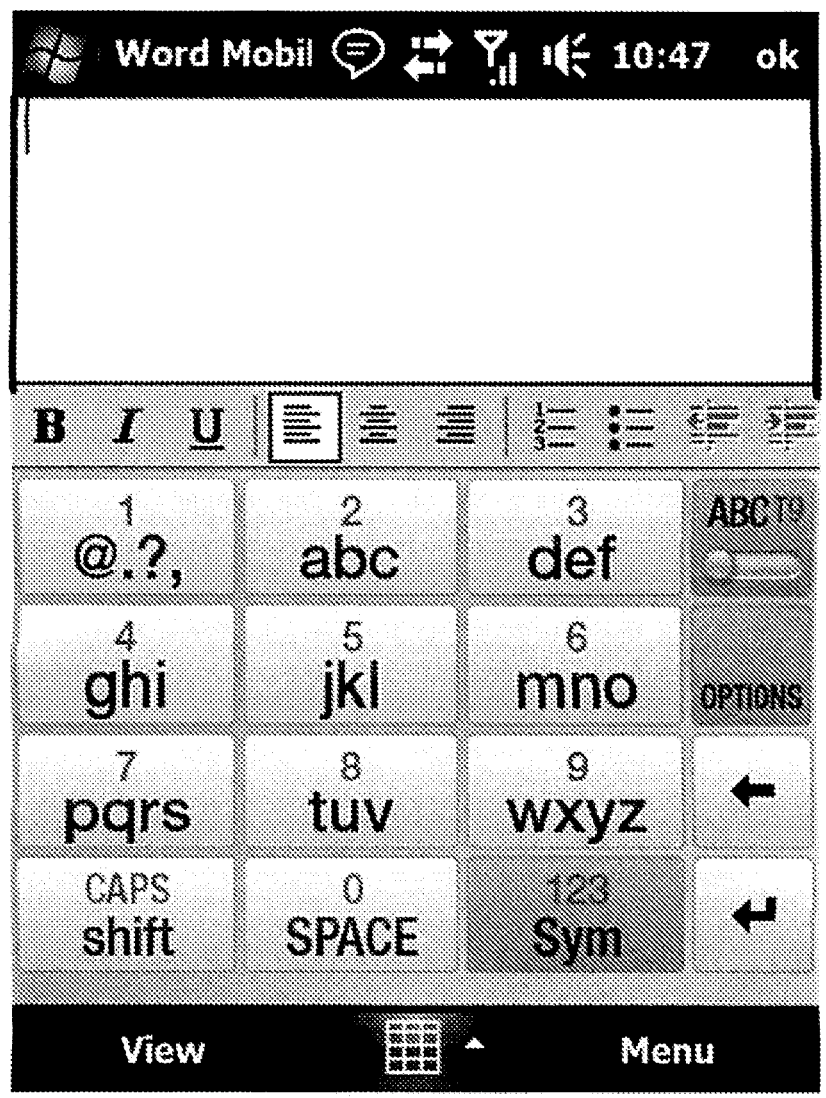
Figure 3:
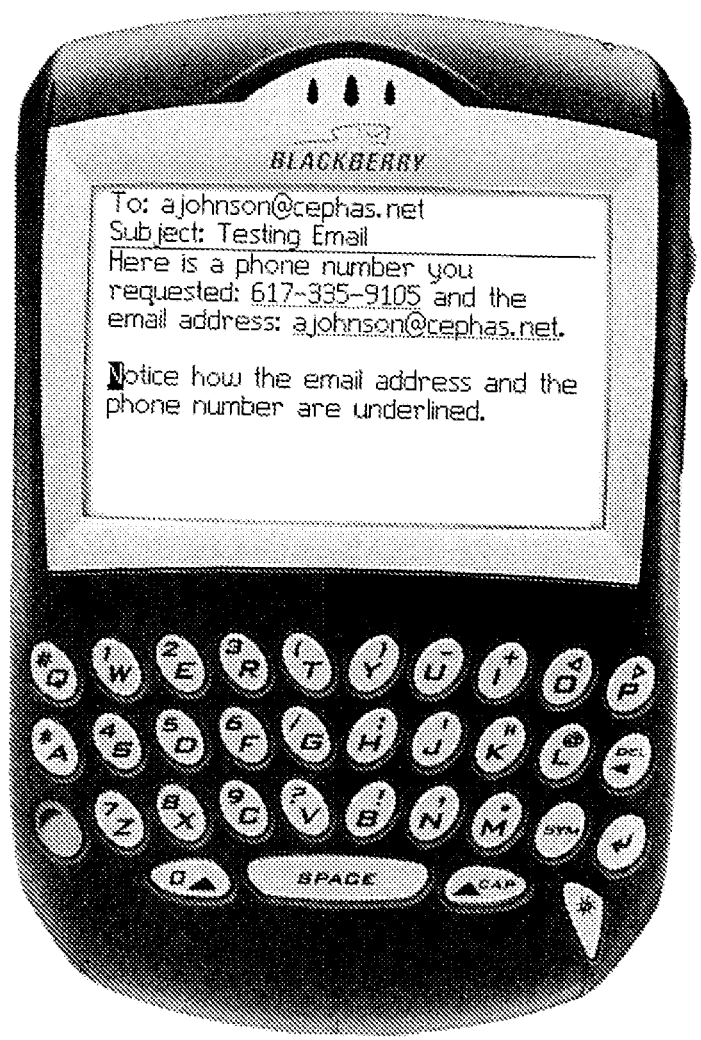
Figure 4:
Figure 5:
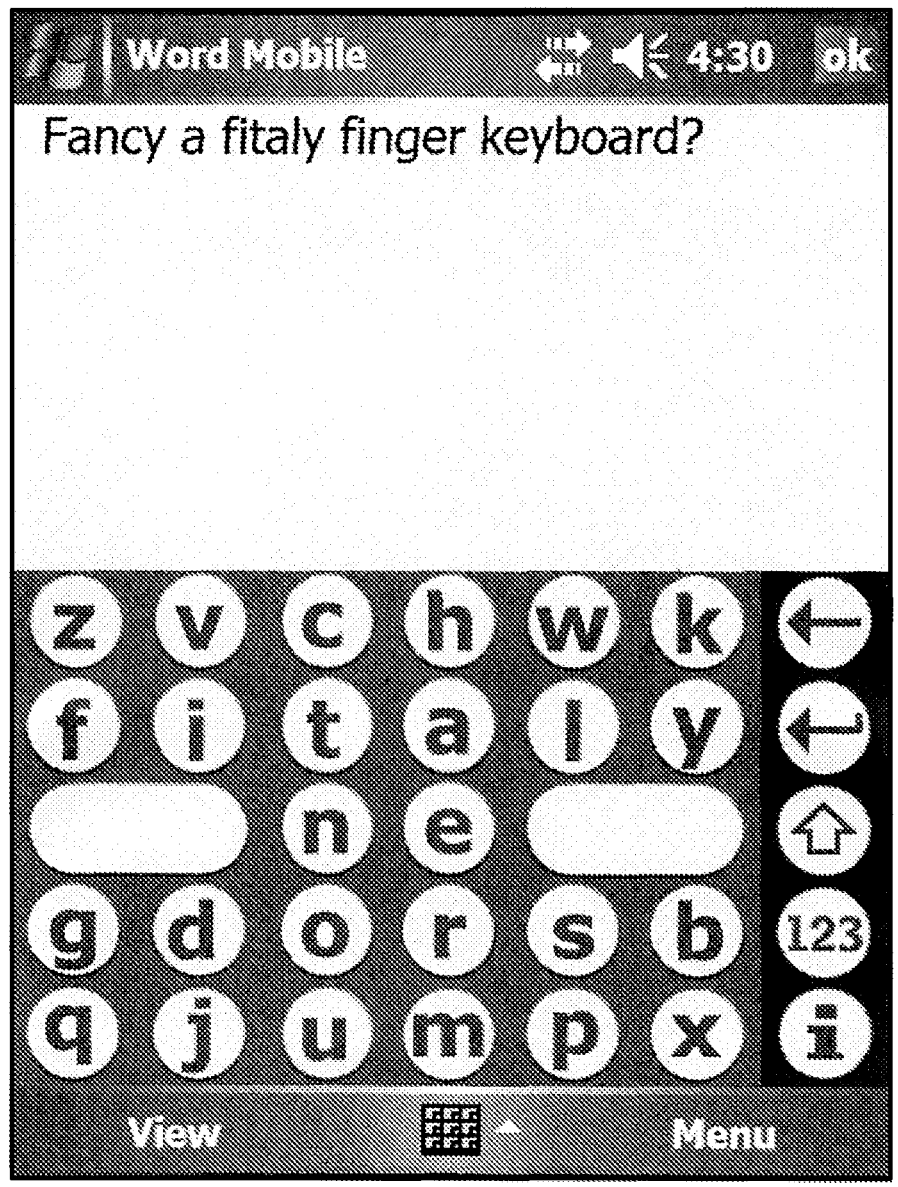
Figure 6:
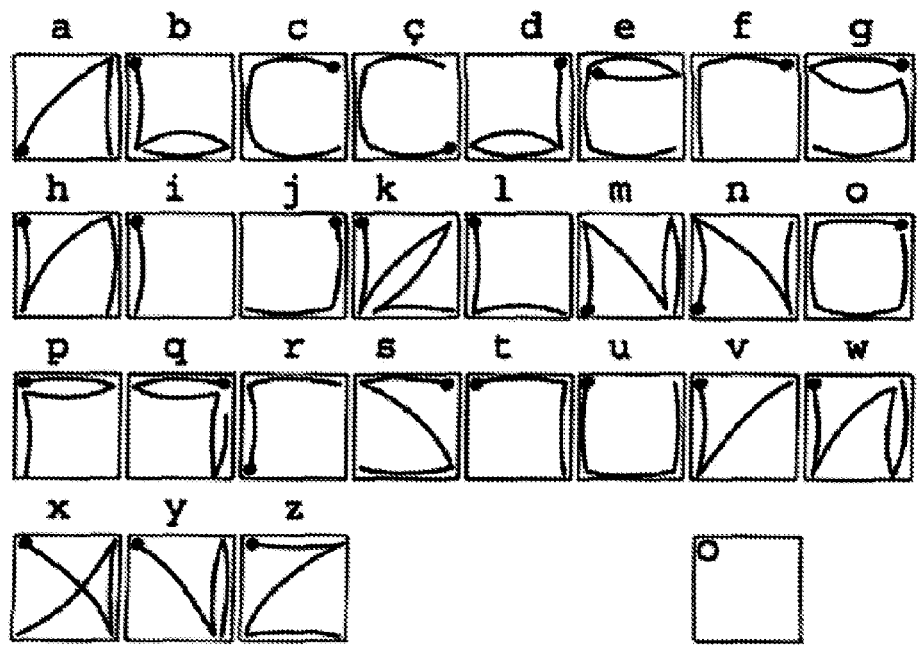
Figure 6:
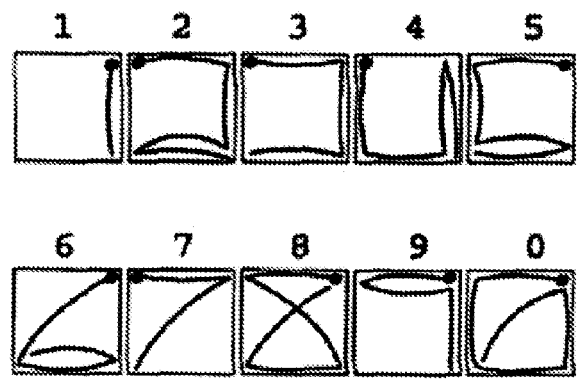
Figure 7:
Figure 8:
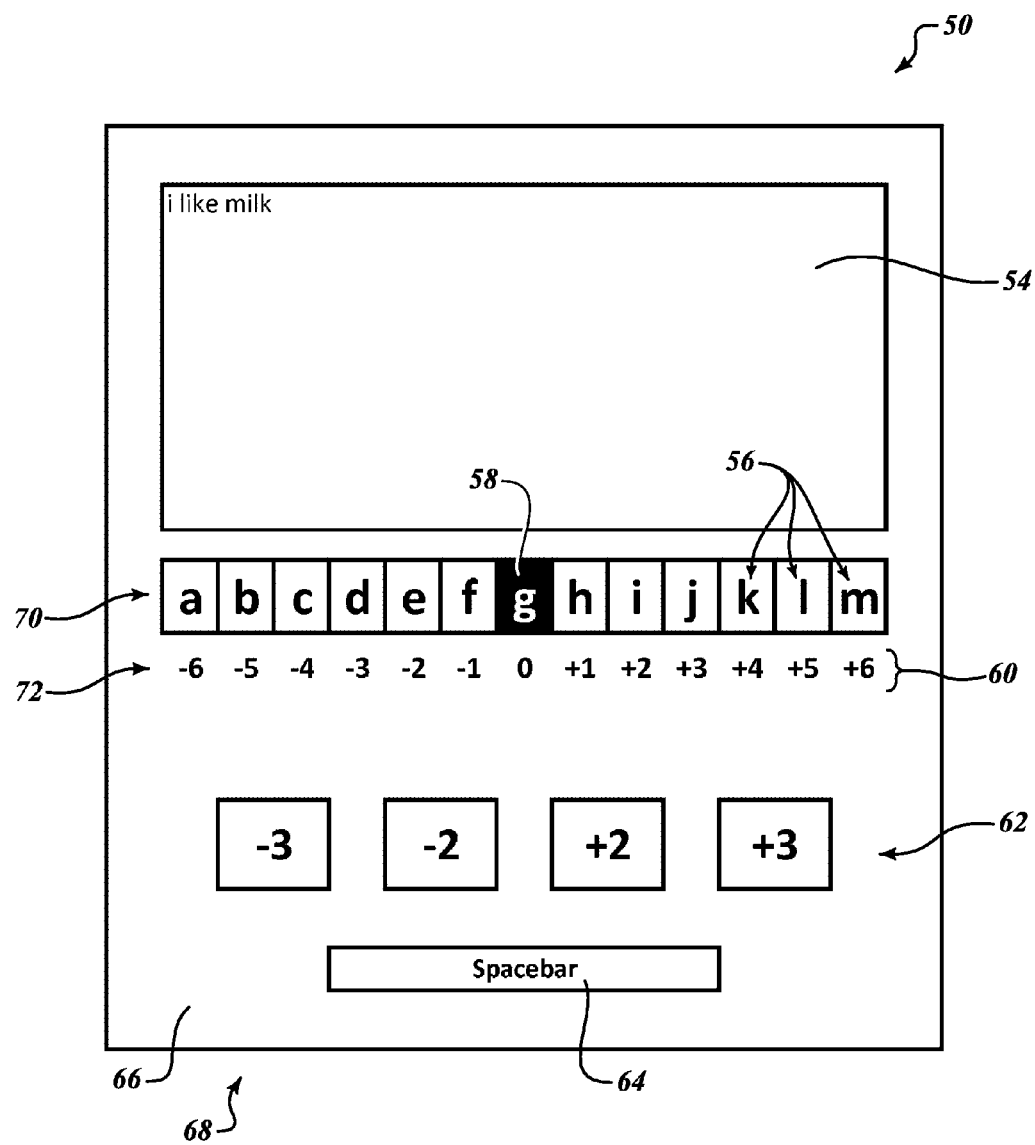
FIG. 8 illustrates a user interface in accordance with one embodiment of the invention.
Figure 9:
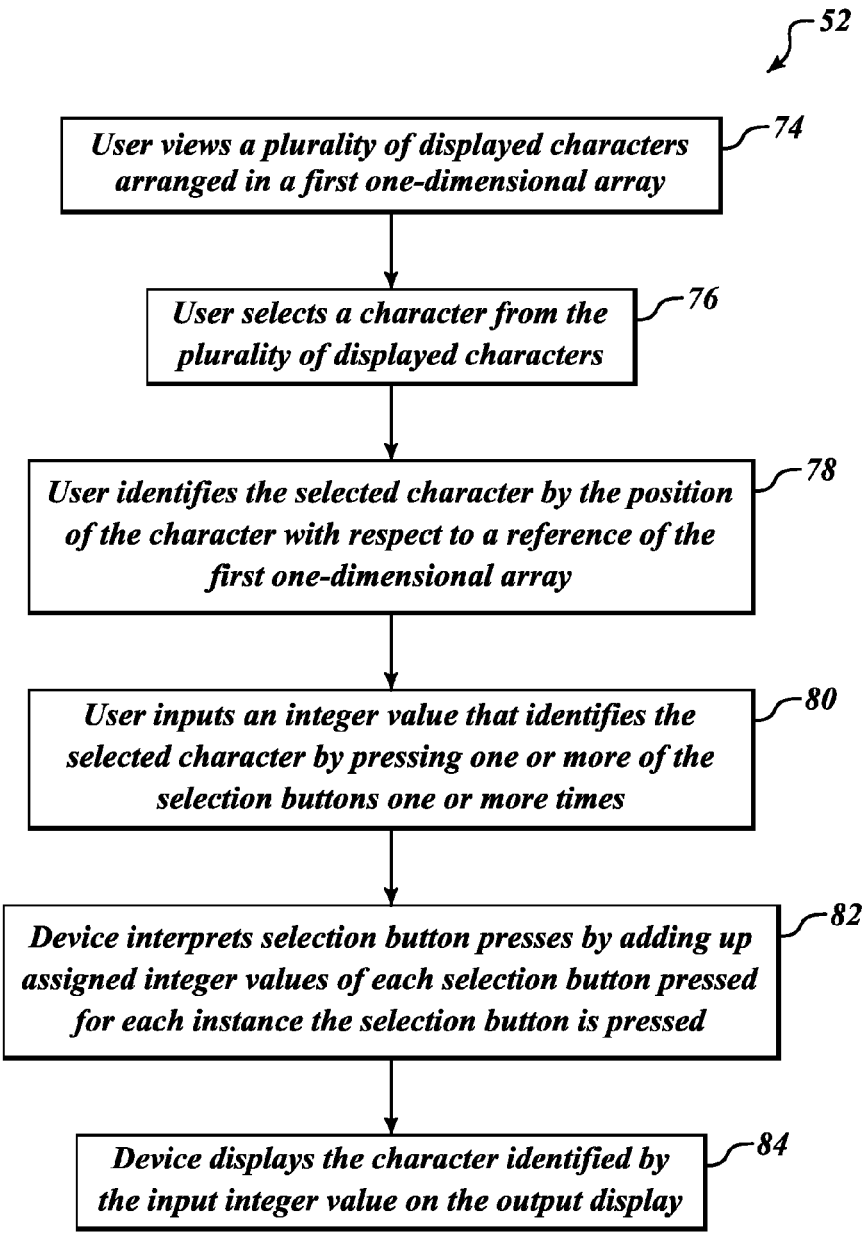
FIG. 9 illustrates a flowchart of a method in accordance with one embodiment of the invention.

FIGS. 8 and 9 show, respectively, a user interface 50 and a character specification method 52 in accordance with one embodiment of the invention.

The user interface 50 of FIG. 8 includes an output display 54, a plurality of displayed characters 56, a reference 58, an offset scale 60, a plurality of selection buttons 62, and a spacebar button 64 on a face 66 of a device 68. The output display 54 is one of a variety of electronic display screens, such as a liquid crystal display (LCD) screen, known in the industry. The selection buttons 62 and spacebar button 64 are buttons that are communicatively coupled with the device 68 and in various embodiments can be either hard keys (physical buttons) or soft keys (buttons presented on a display screen).

The plurality of displayed characters 56 and the offset scale 60 are distributed in respective one-dimensional arrays 70, 72 on the face 66 of the device 68. In one embodiment the respective one-dimensional arrays 70, 72 are positioned on the device 68 so that they lie adjacent to and parallel with one other. In one embodiment, both the plurality of displayed characters 56 and the offset scale 60 are physical features located directly on the face of the device, but in another embodiment they are programmed in software so that they appear as features on the output display 54 of the device 68. In yet another embodiment, the plurality of displayed characters 56 is displayed on the output display 54 and the offset scale 60 is located in a parallel one-dimensional array 72 physically on the face 66 of the device. The one-dimensional arrays 70, 72 can be a plurality of characters arranged in rows, columns, or curved formations.

In one embodiment, the characters of the plurality of characters 56 are distributed in a one-dimensional array in evenly spaced increments. In a further embodiment, values of the offset scale 60 are distributed in a one-dimensional array in increments that match the increment of the plurality of characters 56, so that by referencing the offset scale 60 to the plurality of characters 56, characters of the plurality of characters 56 are effectively numbered.

The reference 58 is an indicator located near or on one of the characters of the plurality of characters 56. The offset scale 60 includes a value of zero that is located to correspond with the reference 58 in the plurality of characters 56. Values of the offset scale 60 increase from zero in pre-selected increments as positions of the offset scale get farther from the zero value. In a further embodiment, values of the offset scale 60 decrease from zero in pre-selected increments as positions of the offset scale get farther from the zero value in a direction opposite to the increasing direction. In one embodiment, the pre-selected increment of the offset scale 60 equals one and the values of the offset scale 60 extend from a negative integer value to a positive integer value passing through zero.

In one specific embodiment, the plurality of characters 56 and the values of the offset scale 60 are each distributed in respective one-dimensional arrays 70, 72 located adjacent to and parallel with one another, the values of the offset scale 60 count in increments of one and are spaced with respect to one another in their array to correspond with the spacing of positions in the array of the plurality of characters 56, and the zero value zero in the offset scale 60 corresponds to the reference 58 of the plurality of characters 56 so that the values of the offset scale 60 label the positions of the array of the plurality of characters 56 according to how many positions a given position in the array of the plurality of characters 56 is offset from the reference 58.

The plurality of selection buttons 62 lie on the face 66 of the device 68 and, as described above, can be either hard or soft keys. Each button is communicatively coupled with the device 68 and is assigned an integer value. The assigned integer value can be either positive or negative. Each button 62 has the function that when the button is pressed the assigned integer value of the button is input to the device 68. In one embodiment, the assigned integer value of each selection button is unique.

The spacebar 64 also lies on the face 66 of the device 68, can be either a hard or soft key, and is communicatively coupled with the device 68.

FIG. 9 shows a flowchart of one embodiment of a character specification method 52 for specifying one character from among a plurality of characters in accordance with the user interface 50 of FIG. 8.

In one step of the method 74, a user views the plurality of characters 56 distributed along a first one-dimensional array 70. In another step 76, the user selects a character from the plurality of displayed characters 56 that is desired for specification. In another step 78, the user identifies the selected character by the position of the character with respect to the reference 58 of the first one-dimensional array 70, for example by an integer value equal to the number of positions the selected character is offset from the reference 58 of the one-dimensional array 70. The user can identify the position of the selected character in a number of ways, including by referencing the position to a corresponding value in the offset scale 60, counting the number of positions that the selected character is offset from the reference 58, recalling from memory the integer value that identifies the particular selected character, and recalling by muscle memory the selection button keystrokes that correspond with the selected character or the selected character's position.

In another step 80, the user inputs the integer value that identifies the selected character by pressing one or more of the selection buttons 62 one or more times. In another step 82, the device 68 interprets the selection button presses. Depending on the embodiment, the device 68 can interpret the selection button presses in a number of ways. In one embodiment, the device interprets selection button presses by adding up the assigned integer values of each selection button pressed for each instance the selection button is pressed. Said another way, the device 68 processes button presses by multiplying the assigned integer value of each selection button pressed by the number of instances the selection button is pressed, and then adds up the calculated products to yield an integer value. Other embodiments that correspond with the user interface of FIG. 8, or that correspond with user interfaces shown in later figures, are discussed below.

In another step of the method 84, the character identified by the input integer value is displayed on the output display 54 of the user interface 50.

According to another embodiment of the invention, the character specification method 52 described above is used iteratively to specify series of characters from the plurality of displayed characters 56. In one embodiment, words and sentences are formed on the output display 54 by iteratively specifying characters according the method above, with the spacebar 64 used to specify to the device the display of spaces between words on the output display.

Figure 10:
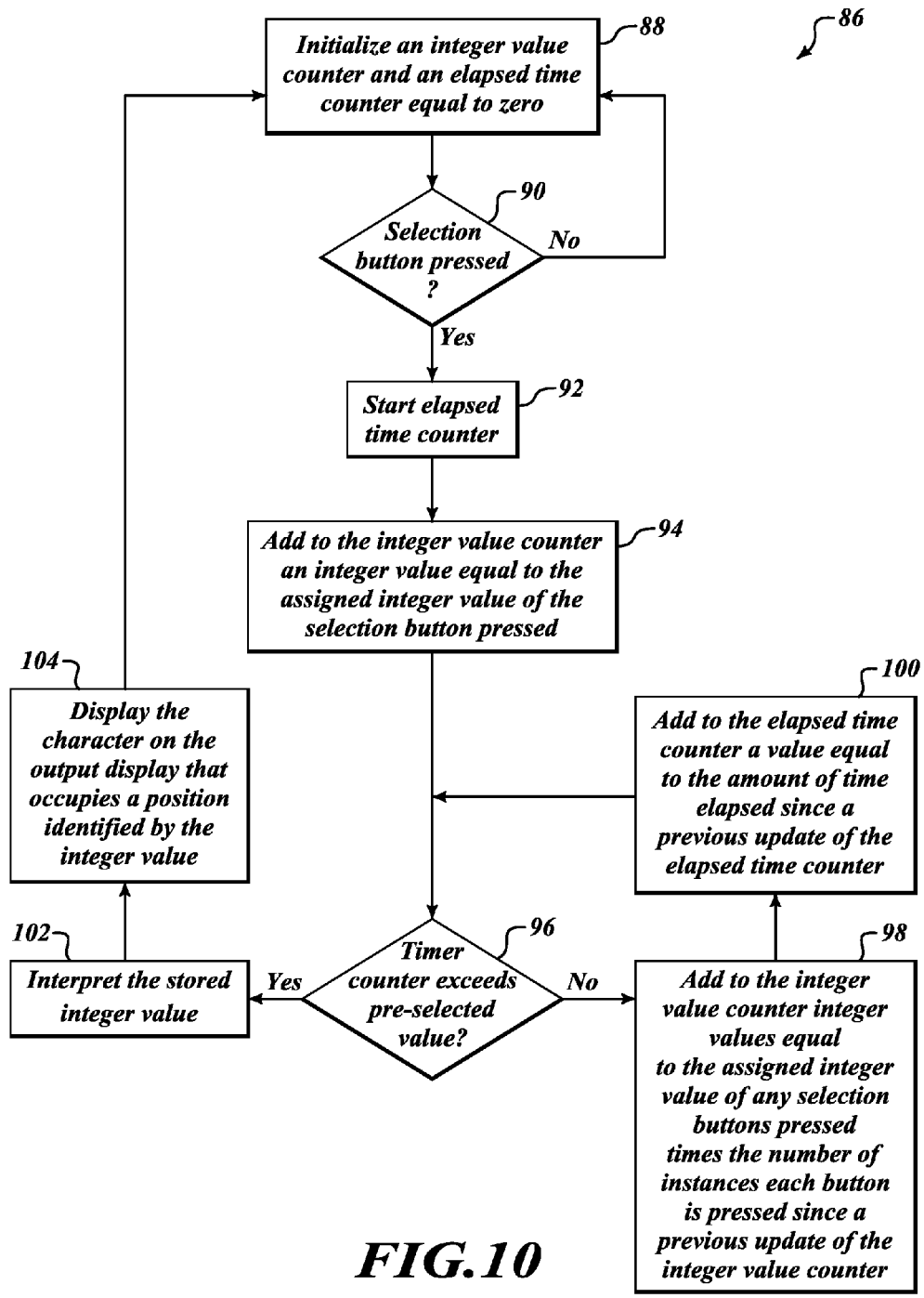
FIG. 10 illustrates a flowchart of a method in accordance with another embodiment of the invention.

FIG. 10 shows one embodiment of a text entry method 86 for specifying series of characters, although there are many alternative embodiments of the method that are within the scope of the invention. In one step 88 of the method 86, the device 68 initializes an integer value counter and an elapsed time counter equal to zero. In another step 92, the device starts the elapsed time counter when it receives indication from a previous step 90 that a selection button has been pressed. In another step 94, the device adds to the integer value counter an integer value equal to the assigned integer value of the selection button pressed. In another step 96, the device compares the elapsed time counter with a pre-selected value to determine if the counter exceeds a pre-selected value.

If the elapsed time counter does not exceed the pre-selected value, in another step 98 the device adds to the integer value counter integer values equal to the assigned integer value of any selection buttons pressed times the number of instances each button is pressed since a previous update of the integer value counter. In another step 100, the device adds to the elapsed time counter a value equal to the amount of time elapsed since a previous update of the elapsed time counter.

If the elapsed time counter does exceed the pre-selected value, in another step 102 the device interprets the integer value stored in the integer value counter, which includes identifying a position in an array of displayed characters corresponding to the stored integer value and further includes identifying a character that corresponds with the identified position. Said another way, the device correlates the selection button presses to a specific character by calculating an integer value from the selection button presses and then matching the calculated integer value up to a position in the array that holds the specific character.

In one embodiment, in a further step 104, the device displays on the output display the character that occupies the position of the array identified by the integer value. According to one embodiment of the method, the device re-initializes the integer value counter and the elapsed time counter to zero and repeats the method in succession. According to an alternative embodiment, the device interprets the integer value stored in the integer value counter and matches the integer value with a corresponding character of the plurality of displayed characters, but does not display the character.

Although the text entry method 86 of FIG. 10 is one embodiment of a method for specifying series of characters, obviously the scope of the method is not limited by this embodiment, but rather by the scope of the claims.

Figure 11:
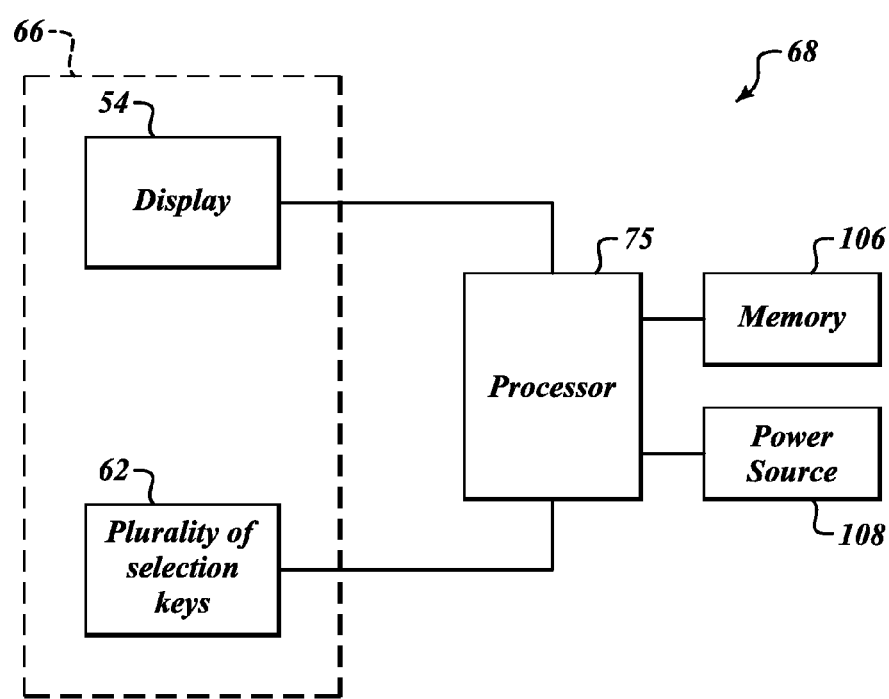
FIG. 11 illustrates a schematic drawing of an electronic device in accordance with one embodiment of the invention.

FIG. 11 shows a schematic drawing of the electronic device 68 in accordance with one embodiment of the invention. The electronic device 68 includes the front face 66, a computer processor 75, the plurality of selection keys 62, the output display 54, a memory 106, and a power source 108. The plurality of selection keys 62, the output display 54, the memory 106, and the power source 108 are communicatively coupled to one another through at least the processor 75. The plurality of selection keys 62 and the output display 54 are located on the front face 66 of the electronic device 68. In one embodiment, the elements 54, 62, 75, 106, 108 of the electronic device 68 shown in FIG. 11 cooperate to enable one or both of the methods 52, 86 disclosed in FIGS. 9 and 10. In another embodiment, the output display 54 and plurality of selection keys 62 of the front face 66 of the device are arranged according to the user interface 50 of FIG. 8.

FIG. 12 shows a table disclosing a specific setup of one embodiment of the invention, including (1) number of selection buttons, (2) assigned integer values for each button, and (3) calculated integer values achievable with the specific values of (1) and (2). In the embodiment of FIG. 12, the number of selection buttons is four and the assigned integer values for each button are −3, −2, +2, and +3. The table shows that for four selection buttons having these assigned integer values, there are 13 possible combinations of integer values that can be calculated using two button presses. As an example, in the first row of the table, Combination No. 1 yields the integer value equal −6 by the selection button with assigned integer value −3 being pressed two times. The second row of the table shows Combination No. 2 yields the integer value −5 by pressing the selection button with assigned integer value −3 one time and the selection button with assigned integer value −2 one time. Scanning the table shows that for four selection buttons with the assigned integer values −3, −2, +2, and +3, all the integer values from −6 to +6, including zero, can be calculated with no more than two button presses.

In a further embodiment of the invention, the setup of FIG. 12 is applied to the user interface of FIG. 8. Referring to FIG. 8, the integer values from −6 to +6 achievable in the setup of FIG. 12 are applied using the method of FIG. 9 or 10 to identify characters of the first one-dimensional array 70 of the user interface of FIG. 8. For example, the letter a is specified by pressing the selection button −3 two times. The character b is specified by pressing the selection button −3 and the selection button −2, each button one time. The character h is selected by pressing the selection button +3 and the selection button −2. The character k is selected by pressing the selection button +2 two times. The character g is selected by pressing the selection button −2 and the selection button +2, each one time. According to the method of FIG. 9 or 10, series of characters can be specified to the device, and according to a further embodiment, displayed on the output display to form words and sentences.

FIG. 13 shows a table disclosing a specific setup consistent with another embodiment of the invention, including (1) number of selection buttons, (2) assigned integer values for each button, and (3) calculated integer values achievable with the specific values of (1) and (2). In the embodiment of FIG. 13, the number of selection buttons is four and the assigned integer values for each button are −3, −1, +1, and +3. The table shows that for four selection buttons having these assigned integer values, 13 possible combinations of integer values continuous from −6 to +6 can be calculated using three or fewer button presses.

For example, Combination No. 2 of the table shows that by pressing the selection button assigned integer value −3 one time and the selection button assigned the integer value −1 two times, the integer value −5 can be tallied. Combination No. 3 of the table shows that by pressing the selection button assigned integer value −3 one time and the selection button assigned the integer value −1 one time, the integer value −4 can be tallied. The integer value −4 could alternatively be tallied by pressing the selection button assigned the integer value −2 two times. As with the embodiment of FIG. 12, a continuous series of the integer values from −6 to +6 is achievable with this setup, including the number zero.

FIG. 14 shows a table disclosing an alternative embodiment of the invention for a setup that includes three selection buttons and the assigned integer values of +2, +3, and +5. According to this embodiment, the method of calculating integer values deviates from the methods of FIGS. 9 and 10, in that the integer values are calculated by multiplication rather than addition. Instead of adding together the assigned integer values of the selection buttons pressed for each instance they are pressed, the assigned integer values are multiplied each instance they are pressed. In a case where only one button is pressed, the integer value calculated is simply the assigned value of the pressed selection key. When two selection buttons are pressed, the integer value calculated is the product of the assigned values of the two pressed selection keys. When three selection buttons are pressed, the integer value calculated is the product of the assigned values of the three selection buttons pressed, and so on. For example, Combination No. 1 yields an integer value of +2. Combination No. 3 yields an integer value of +4 by multiplying +2 times +2. Combination No. 6 yields an integer value of +8 by multiplying +2 times +2 times +2.

Figure 15:
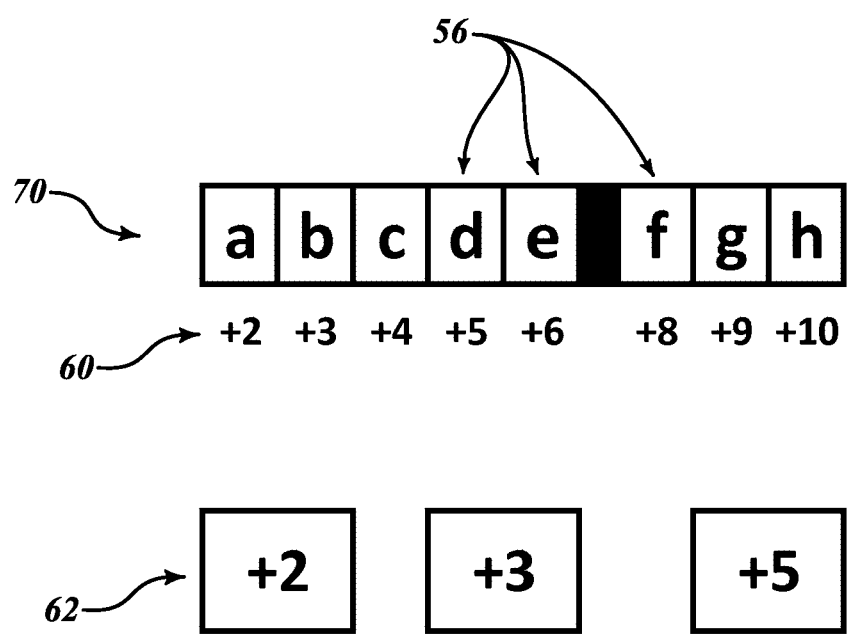
FIG. 15 illustrates a user interface in accordance with one embodiment of the invention.

FIG. 15 shows one embodiment of a user interface compatible with the setup of the embodiment of FIG. 14. FIG. 15 includes the plurality of selection buttons 62, the plurality of characters 56 distributed in the first one-dimensional array 70, and the offset scale 60. In this embodiment, the one-dimensional array 70 has nine positions, eight holding one character of the plurality of characters 56, and one empty position. The offset scale 60 has values from +2 to +6 and +8 to +10. The offset scale 60 is located parallel to the one-dimensional array 70 and each value of the offset scale is located next to a corresponding position of the one-dimensional array. There are three selection buttons 62, with each button assigned a unique value from the group of values +2, +3, and +5.

FIG. 16 shows a table disclosing still another embodiment of the invention having a setup that includes four selection buttons and the assigned integer values of −1, +2, +3, and +5. The embodiment of FIG. 16 relies on the multiplicative method disclosed in FIG. 14, where the assigned integer values of the selection buttons pressed are multiplied according to the number of instances that the button is pressed. In this embodiment, 17 unique integer values can be calculated using three button presses, or alternatively 18 unique integer values using four button presses. As an example, Combination No. 2 of the table yields the integer value −9 by pressing the selection button with the assigned integer value +3 two times and the selection button with the assigned integer value −1 one time. This embodiment provides a high ratio between the number of integer values achieved and the number of selection buttons required.

Figure 17:
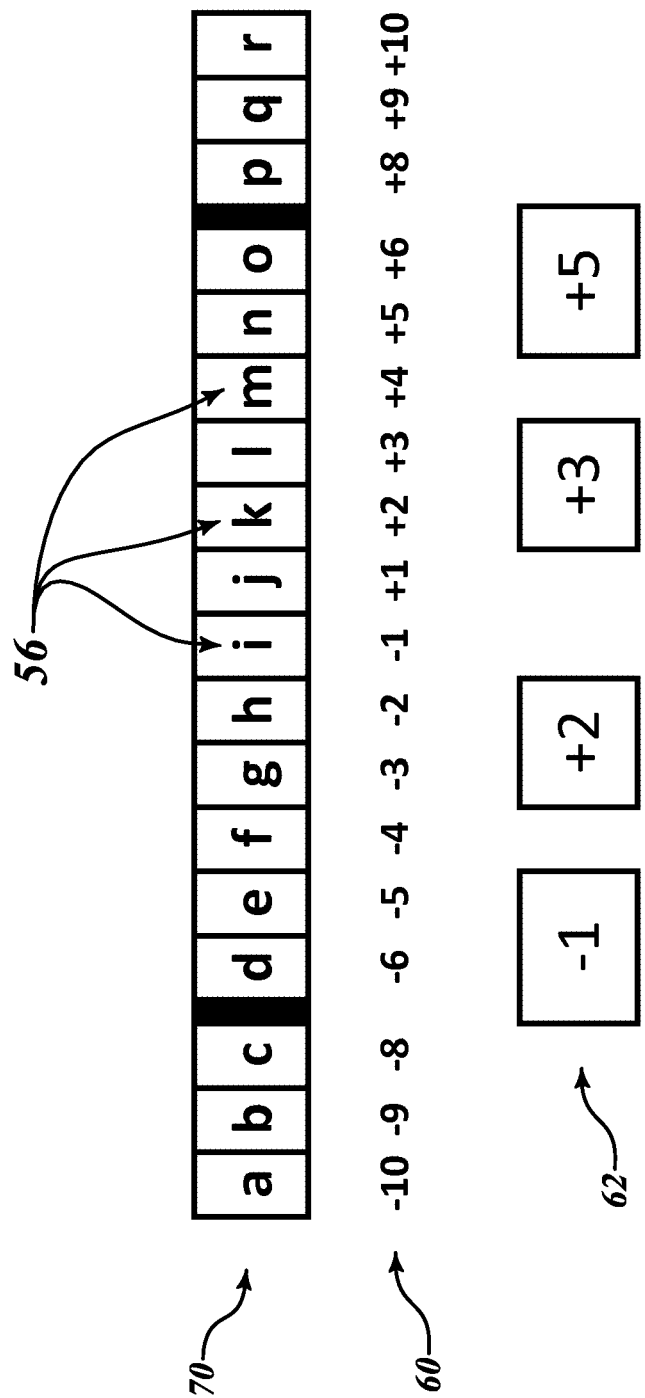
FIG. 17 illustrates a user interface in accordance with another embodiment of the invention.

FIG. 17 shows one embodiment of a user interface compatible with the setup of the embodiment of FIG. 16. FIG. 17 includes the plurality of selection buttons 62, the plurality of characters 56 distributed in the first one-dimensional array 70, and the offset scale 60. In this embodiment, the first one-dimensional array 70 has twenty positions, eighteen holding one character each of the plurality of characters 56, and two empty positions. The offset scale 60 has values from −10 to −8, −6 to −1, +1 to +6 and +8 to +10. The offset scale 60 is located parallel to the first one-dimensional array 70 and each value of the offset scale is located next to a corresponding position of the first one-dimensional array 70. There are four selection buttons 62, with each assigned a unique value from the group of values −1, +2, +3, and +5.

FIG. 18 shows a table disclosing still another embodiment of the invention having a setup that includes five selection buttons and the assigned integer values of −1, +2, +3, +5 and +7. The embodiment of FIG. 18 relies on the multiplicative method disclosed in FIG. 14, where the assigned integer values of the selection buttons pressed are multiplied according to the number of instances that the button is pressed. In this embodiment, 20 unique integer values can be calculated using four button presses. As an example, Combination No. 2 of the table yields the integer value −9 by pressing the selection button with the assigned integer value +3 two times and the selection button with the assigned integer value −1 one time.

Figure 19:
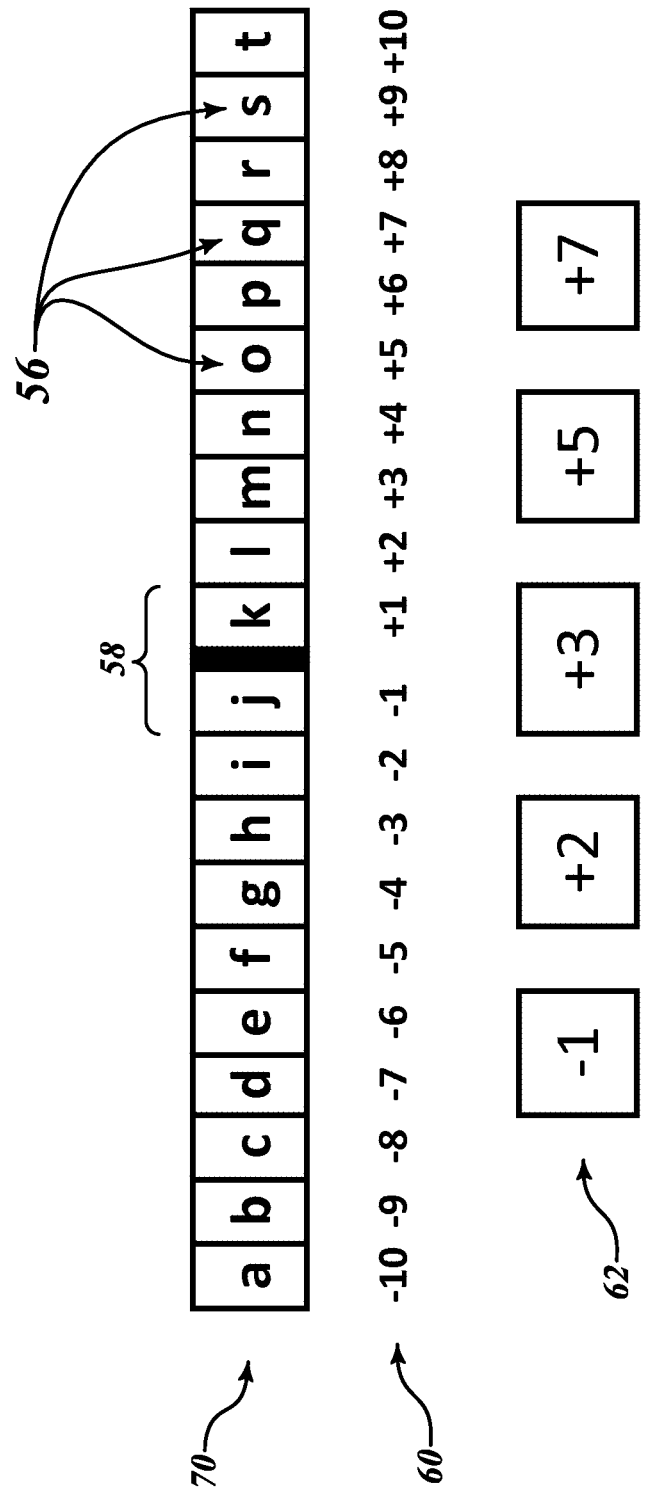
FIG. 19 illustrates a user interface in accordance with still another embodiment of the invention.

FIG. 19 shows one embodiment of a user interface compatible with the setup of the embodiment of FIG. 18. FIG. 19 includes the plurality of selection buttons 62, the plurality of characters 56 distributed in the first one-dimensional array 70, and the offset scale 60. In this embodiment, the first one-dimensional array 70 has 20 positions, each holding one character of the plurality of characters 56. The offset scale 60 has values from −10 to +1 and +1 to +10. The offset scale 60 is located parallel to the first one-dimensional array 70 and each value of the offset scale is located next to a corresponding position of the one-dimensional array. There are five selection buttons 62, with each assigned a unique value from the group of values −1, +2, +3, +5 and +7. In this embodiment, because there is an even number of positions in the first one-dimensional array 70, the reference 58 is located evenly between two of the character positions. In the embodiment of FIG. 19, the reference 58 occurs between the characters j and k that occupy the array.

Figure 20:
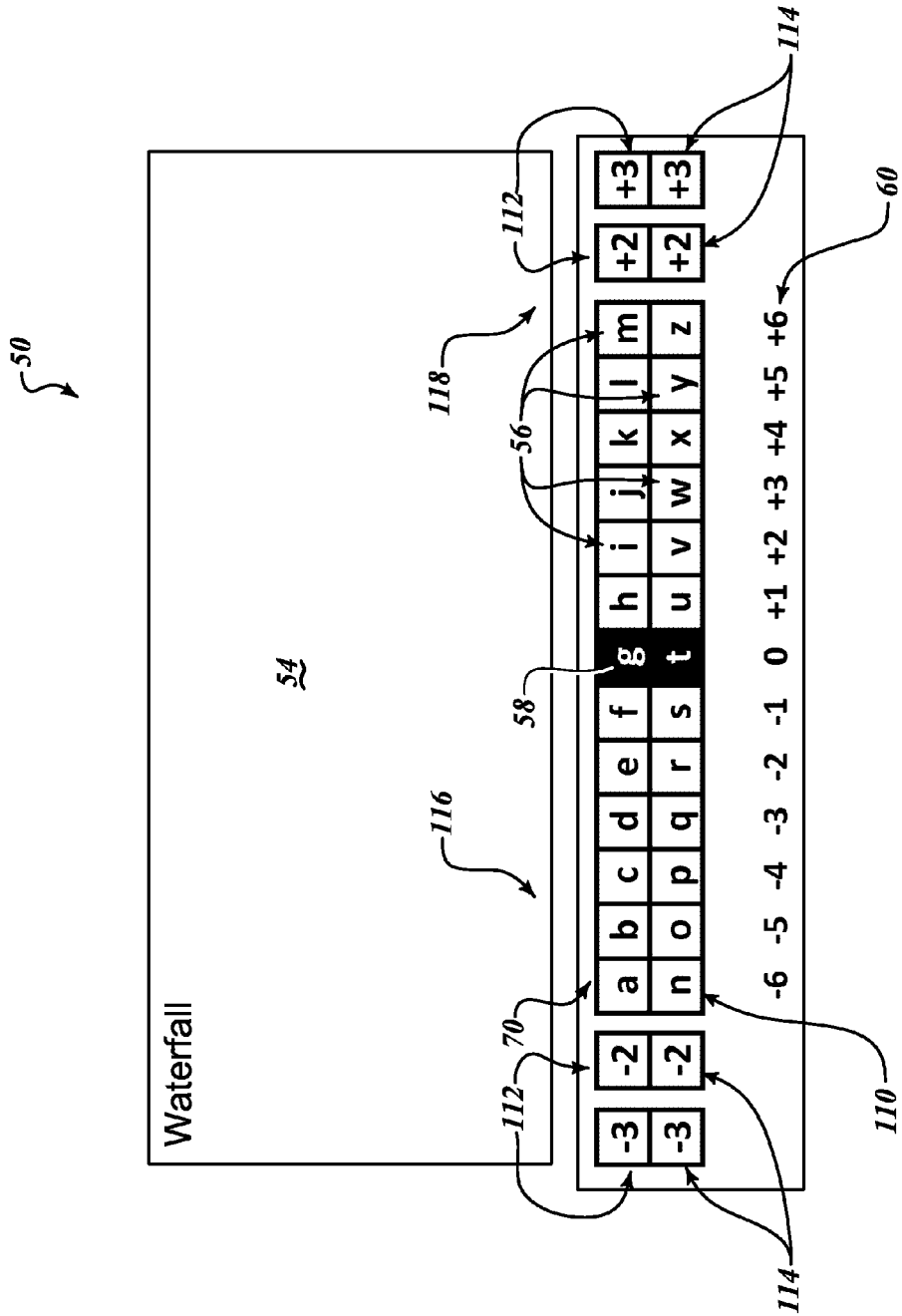
FIG. 20 illustrates a user interface in accordance with another embodiment of the invention.

FIG. 20 discloses an embodiment of the invention having a user interface 50 in which the plurality of displayed characters 56 is distributed among two or more one-dimensional arrays. The user interface 50 includes the plurality of displayed characters 56, first and second one-dimensional arrays 70, 110, first and second pluralities of selection keys 112, 114, the offset scale 60, and at least one reference 58.

The first and second one-dimensional arrays 70, 110 are positioned adjacent to and parallel with one another, and in one particular embodiment are oriented horizontally on the user interface with one array positioned above the other. The offset scale 60 is positioned parallel to the first and second one-dimensional arrays 70, 110, and in one particular embodiment lies below the first and second one-dimensional arrays, but in an alternative embodiment could be above the parallel arrays or between them. The offset scale 60 is positioned so that the zero value corresponds to the reference 58 of the first and second arrays. The offset scale 60 includes values spatially distributed so that each value of the offset scale corresponds with a position of the first and second one-dimensional arrays 70, 110. In a further embodiment, the values number the positions of the first and second one-dimensional arrays 70, 110 with respect to the reference 58.

In a particular embodiment, the first and second one-dimensional arrays 70, 110 include a sufficient number of positions to display all the characters of the English alphabet, as shown in FIG. 20. In a more specific embodiment, the first and second one-dimensional arrays 70, 110 have 13 positions each, are stacked one above the other on the user interface 50, and 13 integer values from −6 to +6 in the offset scale 60 are located on the user interface beneath the stacked one-dimensional arrays.

The first and second pluralities of selection buttons 112, 114 each include four selection buttons. The four selection buttons in each plurality are assigned the integer values of −3, −2, +2, and +3. In one embodiment, the first plurality of selection buttons 112 are aligned along an axis lengthwise with the first one-dimensional array 70 and the second plurality of buttons 114 are aligned along an axis lengthwise with the second one-dimensional array 110. In a further embodiment, each plurality of selection buttons is located with respect to its associated one-dimensional array so that the selection buttons 112, 114 assigned negative integer values are located on a first end 116 of the array identified as the negative positions of the one-dimensional arrays 70, 110 and the selection buttons 112, 114 assigned positive integer values are located on a second end 118 of the array identified as the positive positions of the one-dimensional arrays. In still a further embodiment, the selection buttons 112, 114 are ordered with respect to one another so that buttons with higher assigned values (in terms of absolute value) are located further from the reference than the buttons with lower assigned values (in terms of absolute value). FIG. 20 shows an embodiment in which all three of the above inventive aspects are incorporated: the respective selection buttons 112, 114 are in alignment with their respective one-dimensional arrays 70, 110, the selection buttons 112, 114 are located so that buttons with positive values are located on the positive end 118 of the array and buttons with negative values are located on the negative end 116 of the array, and the buttons 112, 114 assigned integer values corresponding to a higher absolute value are further from the reference 58.

In one embodiment, the elements of the user interface of FIG. 20 operate according to one or both of the methods of FIGS. 9 and 10, the first one-dimensional array 70 and first plurality of selection keys 112 operating effectively independently from the second one-dimensional array 110 and second plurality of selection keys 114. In a further embodiment, the independently operating first and second one-dimensional arrays 70, 110 and first and second pluralities of selection keys 112, 114 share one output display 54 and characters from the first and second arrays are displayed in succession on the output display according to the order in which integer values input via the button presses of the first and second pluralities of buttons 112, 114 are received.

Figure 21:
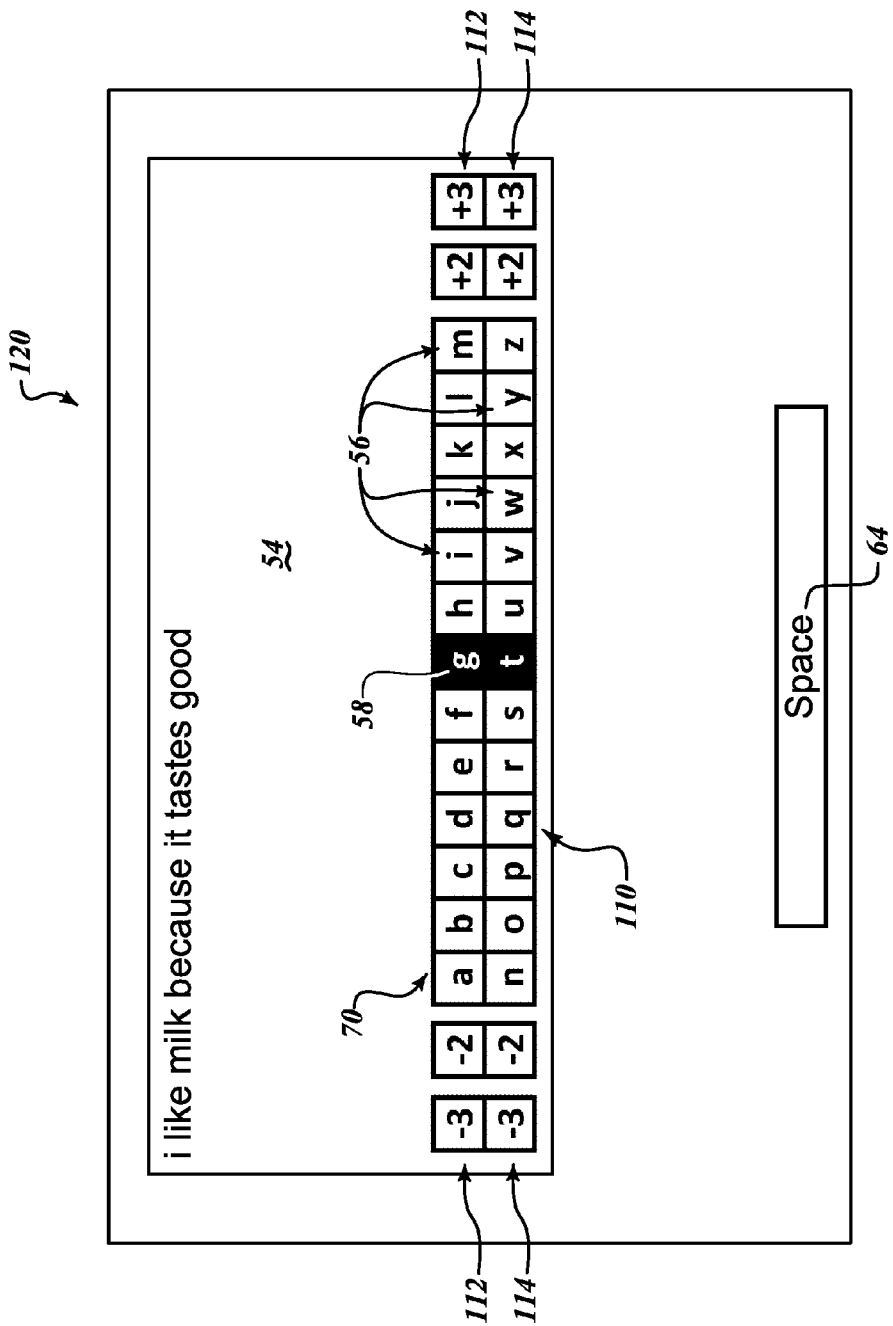
FIG. 21 illustrates an electronic device in accordance with one embodiment of the invention.

FIG. 21 shows a portable electronic device 120 in accordance with one embodiment of the invention. The portable electronic device 120 includes the output display 54, the plurality of displayed characters 56, the first and second one-dimensional arrays 70, 110, the reference 58, and the first and second pluralities of selection buttons 112, 114. In accordance with the user interface of FIG. 20 and the methods described in FIGS. 9 and 10, the user views the plurality of characters 56, selects a character for specification, identifies the character—first by the one-dimensional array the character occupies and second by the character's position in the array with respect to the reference—and inputs an integer value to the portable electronic device 120 by pressing the selection keys 112, 114 corresponding to the array 70, 110 that holds the selected character and having the assigned integer values that add up to the integer value that identifies the character in the appropriate array.

In a further embodiment, the portable electronic device 120 includes the spacebar 64 that is communicatively coupled with the device and that when pressed outputs a space to the output display 54. In one embodiment the user holds the portable electronic device 120 between the palms of his or her hands so that the thumbs of the user land over the respective groups of selection buttons 112, 114 at each end of the one-dimensional arrays 70, 110.

Figure 22:
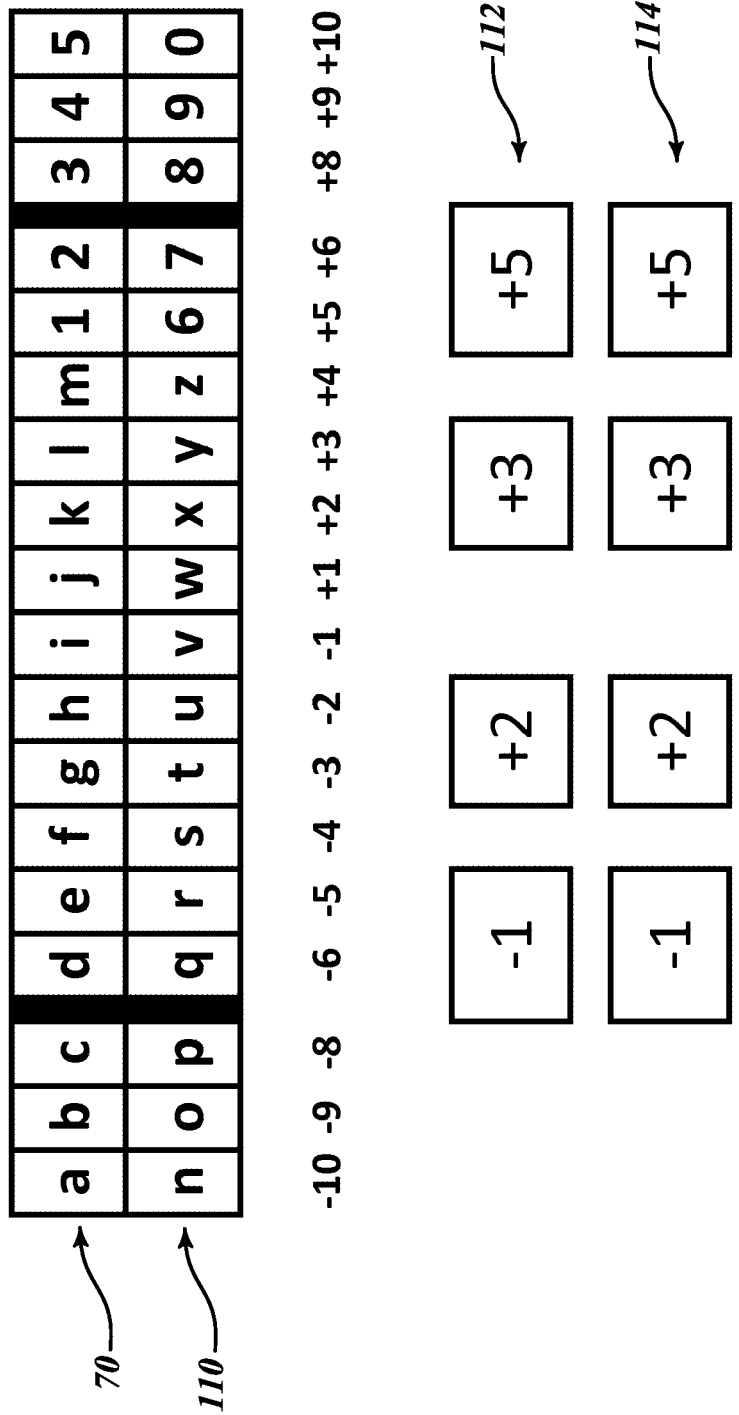
FIG. 22 illustrates a user interface in accordance with yet another embodiment of the invention.

FIG. 22 shows an alternative user interface in accordance with another embodiment of the invention. As with the embodiment of FIG. 20, this embodiment includes two one-dimensional arrays 70, 110, but also has a sufficient number of positions to display all the characters of the English alphabet and the ten numerical digits, 0-9. In one respect, the user interface of FIG. 22 is two of the user interfaces of the embodiment of FIG. 17 combined on a single interface. The user interface applies the setup of the embodiment of FIG. 16, which includes two pluralities of selection buttons 112, 114 having four selection buttons each and the assigned integer values −1, +2, +3, and +5. The embodiment of FIG. 22 provides for a total of 36 characters and operates according to the multiplicative method, as disclosed in FIG. 14.

FIG. 23 shows a table that ranks the speed with which different selection button stroke combinations can be executed by a user. The four columns of the table include a speed ranking, categories of keystroke combinations, example keystroke combinations in each category, and an orientation label that identifies a ranking of 1 as fastest and a ranking of 4 as slowest.

Referring to the user interface of FIG. 20 in the context of the electronic device of FIG. 21, inputting an integer value by pressing the selection keys requires at least one of four unique keystroke combinations. One possible keystroke combination is a single click of a single button, as shown in the first row of the table of FIG. 23. An example from the interface of FIG. 21 is the keystroke combination used to get an integer value of −3 or +2. A second possible keystroke combination is a single click of two buttons with separate thumbs, as shown in row two of the table of FIG. 23. An example of this keystroke combination from FIG. 21 is the strokes used to get the integer value of −1, which requires the pressing of −3 with the left thumb and +2 with the right thumb, resulting in the specification of the letter f or s, depending on the one-dimensional array selected.

A third possible stroke combination is a double click of a single button, as shown in row three of the table of FIG. 23. An example of this keystroke combination from FIG. 21 is the strokes used to get the integer value of −6, which requires the pressing of −3 twice with the left thumb. Another example is the integer value +4, which requires the pressing of +2 twice with the right thumb. A fourth possible keystroke combination is a single click of two buttons with the same thumb, as shown in row four of the table of FIG. 23. An example of this stroke combination from FIG. 21 is the strokes used to get the integer value of −5, which requires the pressing of −3 and −2, both with the left thumb.

These four categories of keystroke combinations vary in the speed that they can be executed by a user. Naturally the fastest stroke combination to execute is the single click of a single button. The next fastest combination is a single click of two buttons with separate thumbs because the two button presses can effectively be pressed simultaneously. The third fastest combination is a double click of a single button, which is limited only by the speed that a user can double-click. The fourth and slowest combination is the single click of two buttons with the same thumb, which requires the thumb or finger to move between selection buttons and therefore takes more time to execute than the others. The varying speeds of the categories of keystroke combinations make it advantageous to selectively arrange the characters among the positions of the one-dimensional arrays to maximize entry speed. In one embodiment, the particular letters of a language are arranged among the positions of a one-dimensional array so that the most frequently used letters of a language are located in positions of the array that correspond with fast keystroke combinations. Naturally, in that same embodiment, the least frequently used letters of a language are located in positions of the array that correspond with slow keystroke combinations.

FIG. 24 shows a table of values corresponding to the frequency that each letter of the English alphabet is used in the English language taken from the prior art. In the table, the values are ranked according to their frequency of use.

Figure 25:
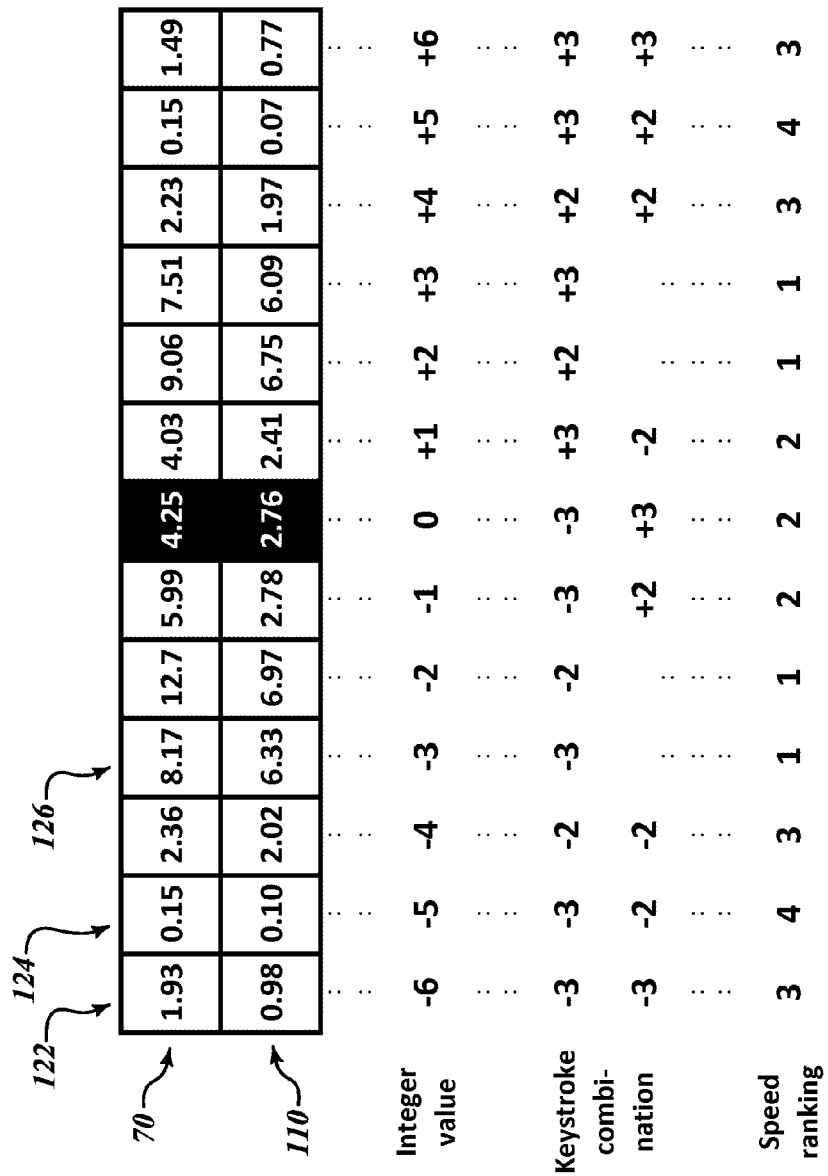
FIG. 25 illustrates an arrangement of the frequency of use values of the English language on a user interface in accordance with one embodiment of the invention.

FIG. 25 shows one arrangement of the values from the table of FIG. 24 applied to the user interface of FIG. 20 according to the principles of FIG. 23. The three rows below the user interface show the integer value, the keystroke combination (from FIG. 23), and the speed ranking (also from FIG. 23) for each position of the one-dimensional arrays of the user interface of FIG. 20. Starting at a left-most position 122 of one of the one-dimensional arrays 70, 110 and reading down across the rows, for the frequency of use values 1.93 and 0.98, the integer value is −6, the keystroke button combination is (−3, −3), and the speed ranking is 3. Continuing, in another example, with a second left-most position 124 of the arrays, for the frequency of use values of 0.15 and 0.10, the integer value is −5, the keystroke button combination is (−3, −2), and the speed ranking is 4. In another example, jumping to a fourth position from the left end of the array 126, for the frequency of use values 8.17 and 6.33, the integer value is −3, the keystroke button combination is (−3), and the speed ranking is 1.

In one embodiment of the invention, as shown in FIG. 25, letters of an alphabet are distributed among the positions of the arrays of the user interface according to the speed of keystroke execution, according to the principles disclosed in FIG. 23. The embodiment of FIG. 25 demonstrates this embodiment by the appearance of high frequency values in positions of high speed ranking (i.e., 1 or 2) and low frequency values in positions of low speed ranking (i.e., 3 or 4).

For example, the position in the first array 70 of the interface corresponding with integer value −2 has a frequency of use of 12.7 and a speed ranking of 1. In another example, the position in the second array 110 of the interface corresponding with the integer value +3 has a frequency of use of 6.09 and a speed ranking of 1. In still another example, the position in the first array 70 of the interface corresponding with the integer value +5 has a frequency of use of 0.15 and a speed ranking of 4.

Figure 26:
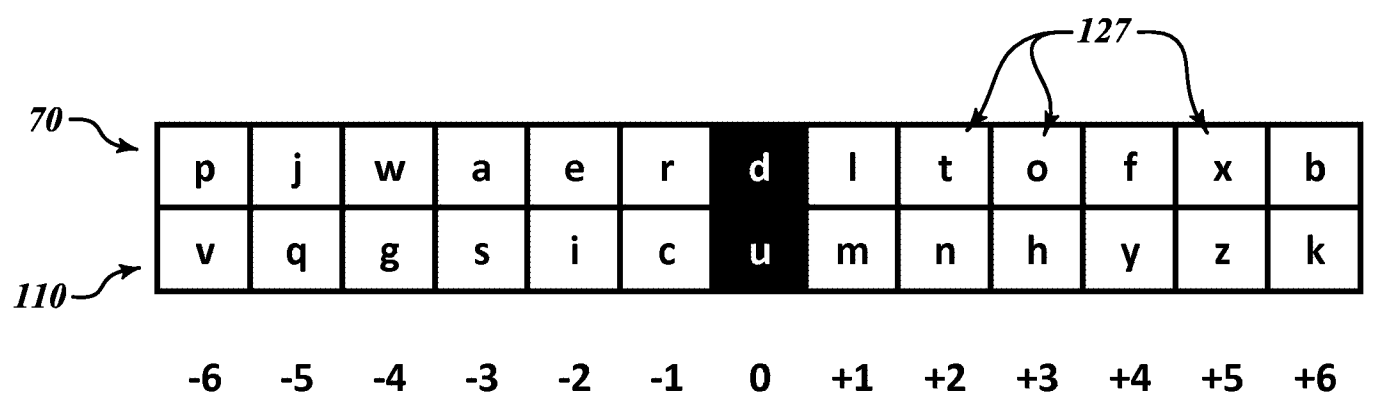

FIG. 26 shows the distribution 127 of letters of the English alphabet that correspond to the distribution of the frequency of use values of FIG. 25. Clearly the distribution of characters and frequency of use values shown in FIGS. 25 and 26 are only one embodiment of this aspect of the invention. Because many positions of the user interface have the same speed ranking, a significant number of arrangements of characters are possible that apply this aspect of the invention.

Figure 27:
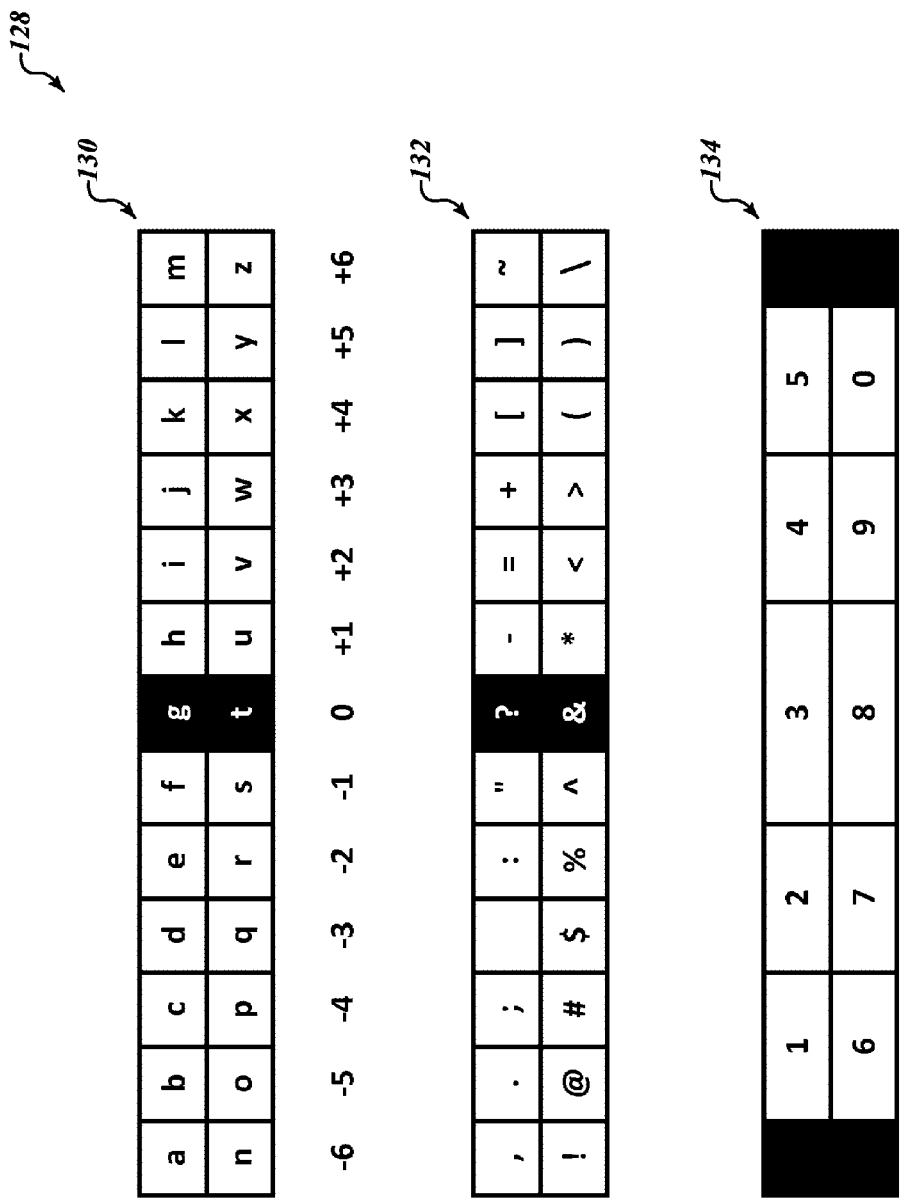
FIG. 27 illustrates a user interface in accordance with yet another embodiment of the invention.

FIG. 27 shows an embodiment of the invention in which the plurality of characters include letters of an alphabet, punctuation, and the digits 0-9 distributed across multiple panels 128. According to one embodiment of the invention, the panels 128 of characters are displayed in succession on the output display 54, with one panel shown in place of another. The particular panel shown is controlled by a user with a selection or toggle button. In the embodiment of FIG. 27, a first panel 130 contains letters, a second panel 132 punctuation characters and a third panel 134 digits, but other distributions of characters are within the scope of the invention. In an alternative embodiment, letters, punctuation, and digits may be included on the same panel, as in the user interface of FIG. 22. In still another embodiment, one of the one-dimensional arrays having punctuation is included on the panel having the two one-dimensional arrays of letters. In the third panel 134, positions of the one-dimensional array are combined so that only ten positions are shown, each having a numeric digit.

Figure 28:
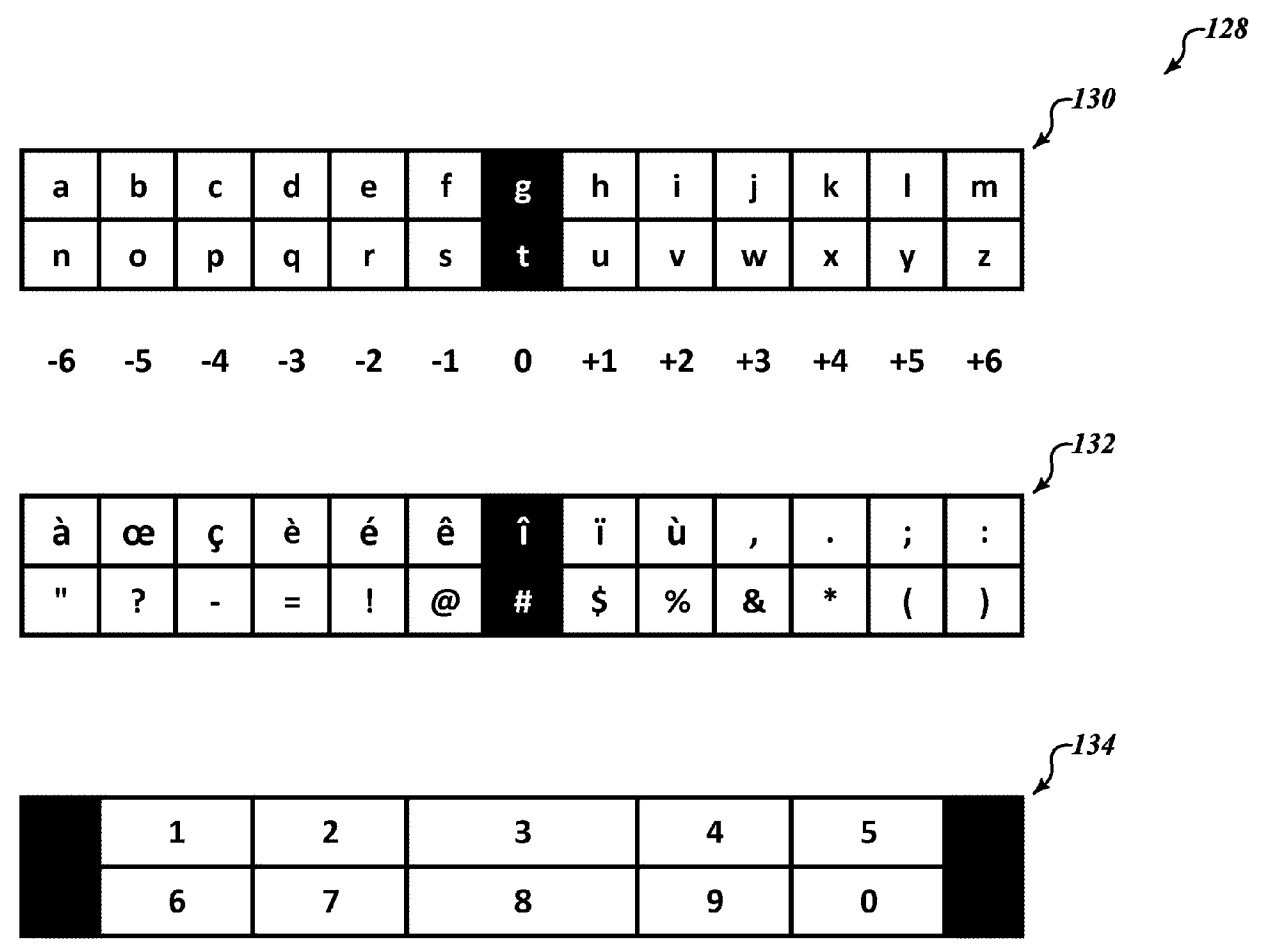

FIG. 28 shows yet another embodiment of the invention in which letters of the French language are distributed among the multiple panels 128 of the user interface. In the embodiment of FIG. 28 the characters of the French language are split among the first and second panels 130, 132, but in an alternative embodiment the user interface could include more positions in each one-dimensional array of the first panel 130 or could include a third one-dimensional array and corresponding plurality of selection keys in the first panel 130.

Figure 29:
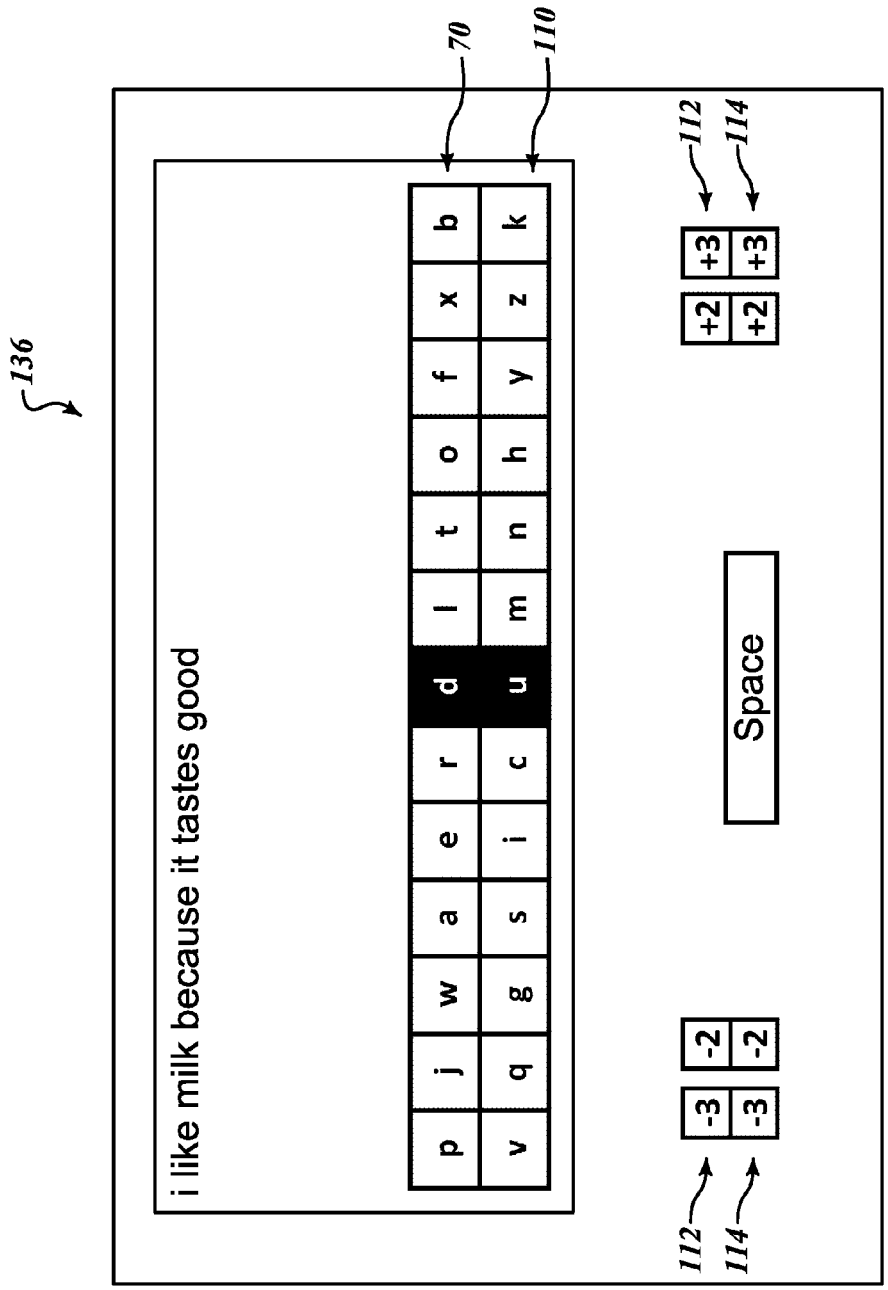
FIGS. 29-35 show electronic devices in accordance with still other embodiments of the invention.

FIG. 29 shows an embodiment of the invention in which the user interface 50 of FIG. 20 and the distribution 127 of FIG. 26 are applied to an electronic device 136 that is enabled to operate according to at least one of the methods 52, 86 of FIGS. 9 and 10. In the embodiment of FIG. 29, the selection keys 112, 114 are hard keys, but in an alternative embodiment the selection keys are soft keys shown on the output display. The top row of selection buttons 112 corresponds with the first one-dimensional array 70 and the bottom row of selection buttons 114 corresponds with the second one-dimensional array 110.

Figure 30A:
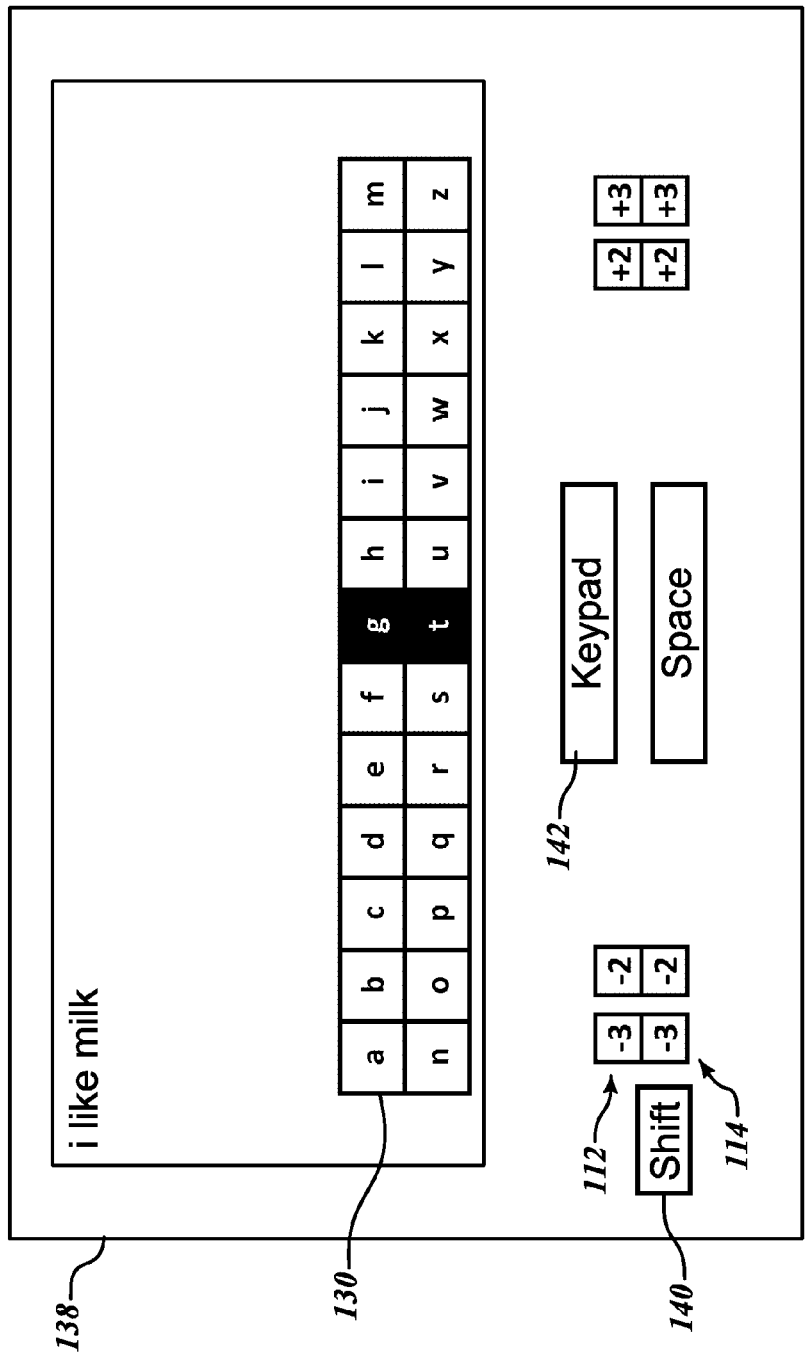
Figure 30B:
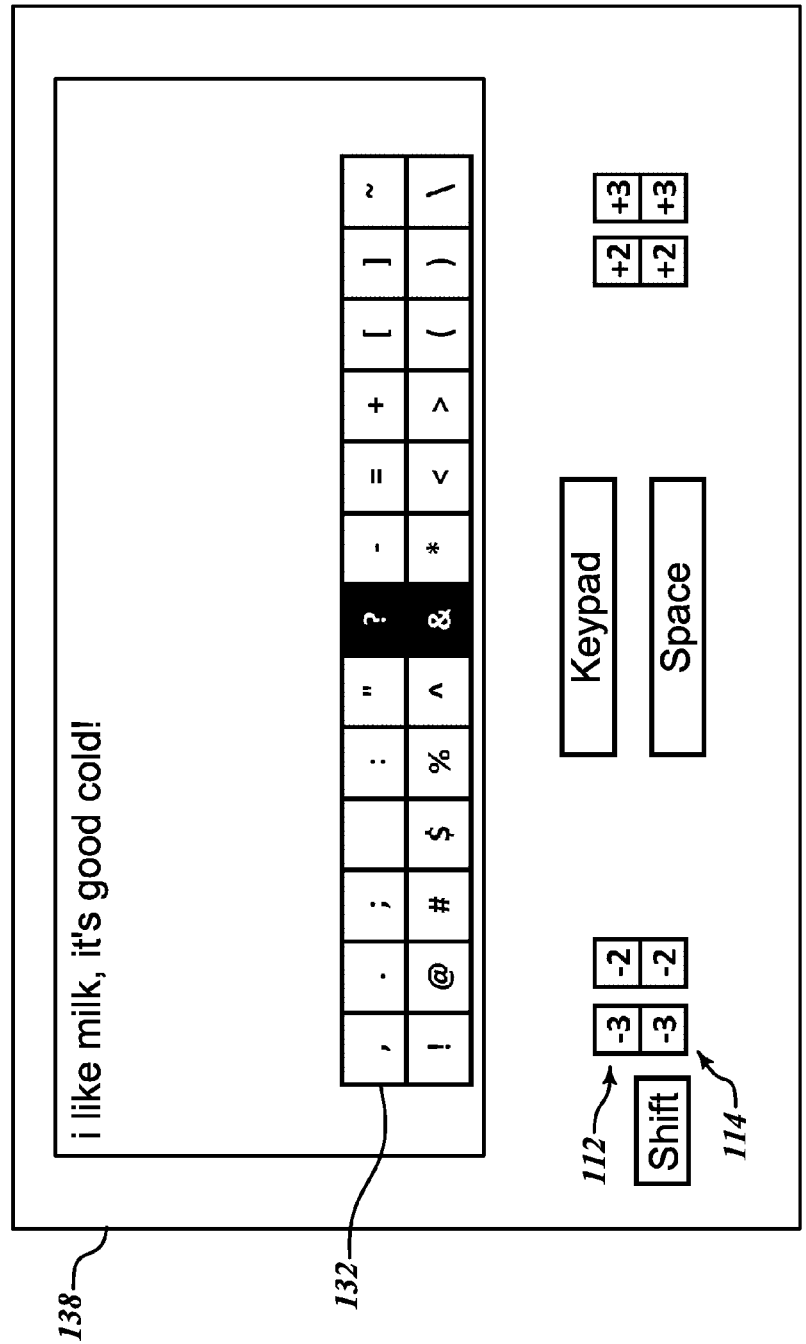
Figure 30C:
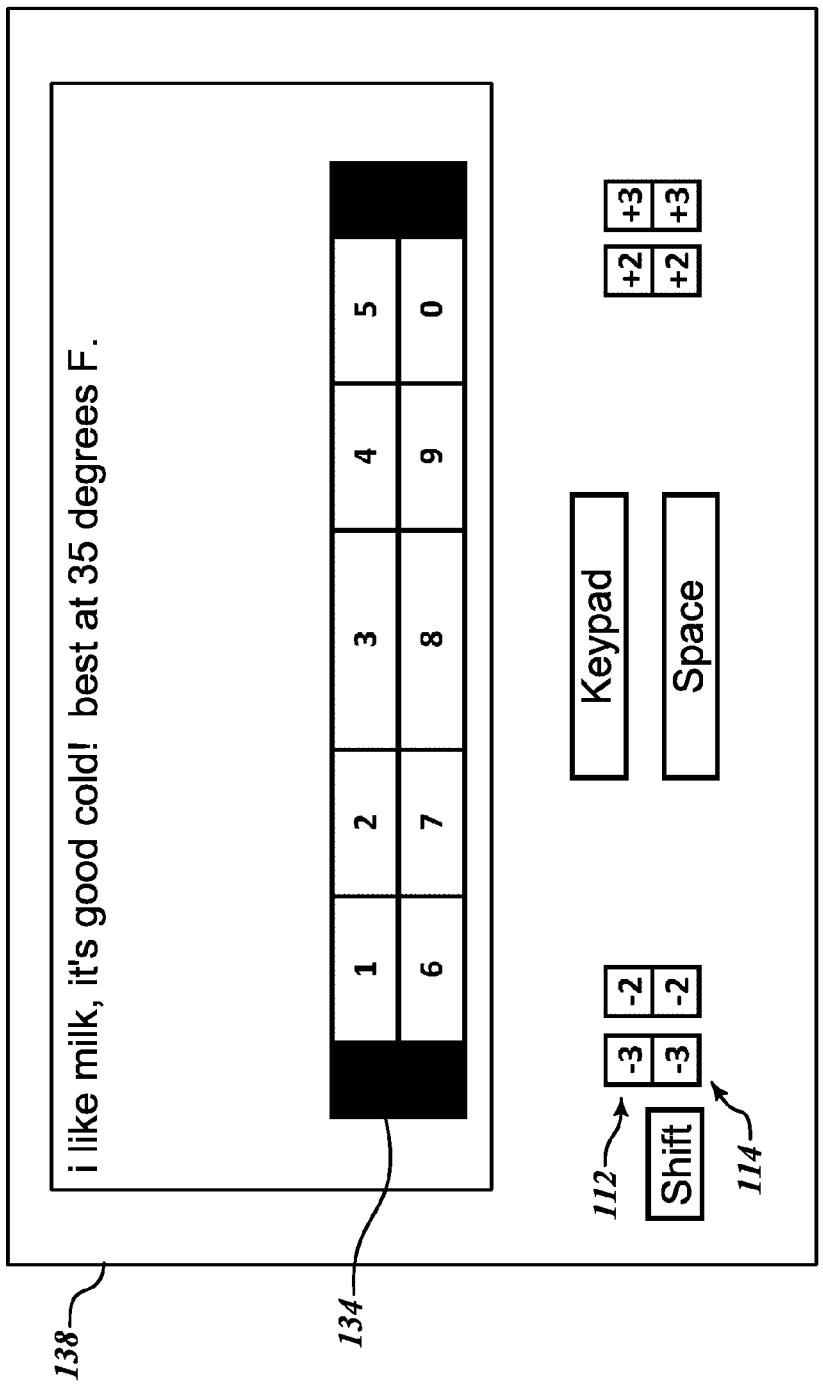

FIGS. 30A-30C show an embodiment of the invention in which the user interface 50 of FIG. 20 is applied to an electronic device 138 and that is enabled to operate according to at least one of the methods 52, 86 of FIGS. 9 and 10, and further includes the multiple panels 128 according to the disclosure of FIG. 27. The electronic device also includes a Shift key 140 and a Keypad key 142. The Shift key 140 functions to replace the first panel 130 with the second panel 132 that holds punctuation and the Keypad key 142 functions to replace the first panel 130 with the third panel 134 that holds numeric characters.

Figure 31:
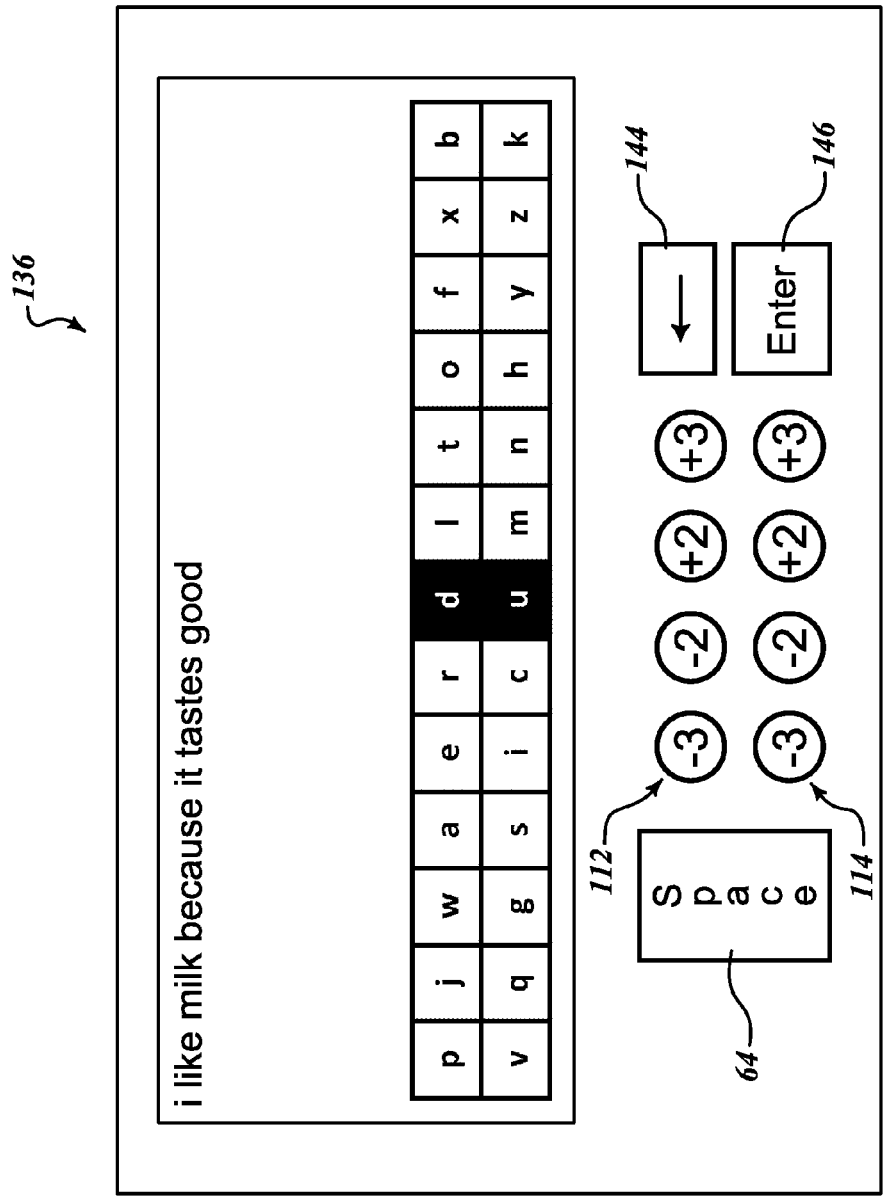

FIG. 31 shows an embodiment of the invention as disclosed in FIG. 29, but in which the plurality of selection buttons 112, 114 are arranged in continuous rows, in other words without space between the buttons assigned negative integer values and buttons assigned positive integer values. The embodiment also includes a Backspace button 144, an Enter key 146, and the spacebar 64. Arranging the plurality of selection buttons 112, 114 in a continuous row enables the user to press selection buttons with negative assigned integer values with the right thumb and vice versa. This arrangement enables more options for how selection buttons are pressed. For example, for the combination of (−3, −2), the −3 button could be selected with the left thumb and the −2 button with the right hand thumb, which can be accomplished simultaneously, rather than by pressing both buttons with the left hand thumb, which can only be accomplished one after the other. This arrangement of selection keys also makes button pressing with the fingers, rather than the thumbs, more convenient.

Figure 32:
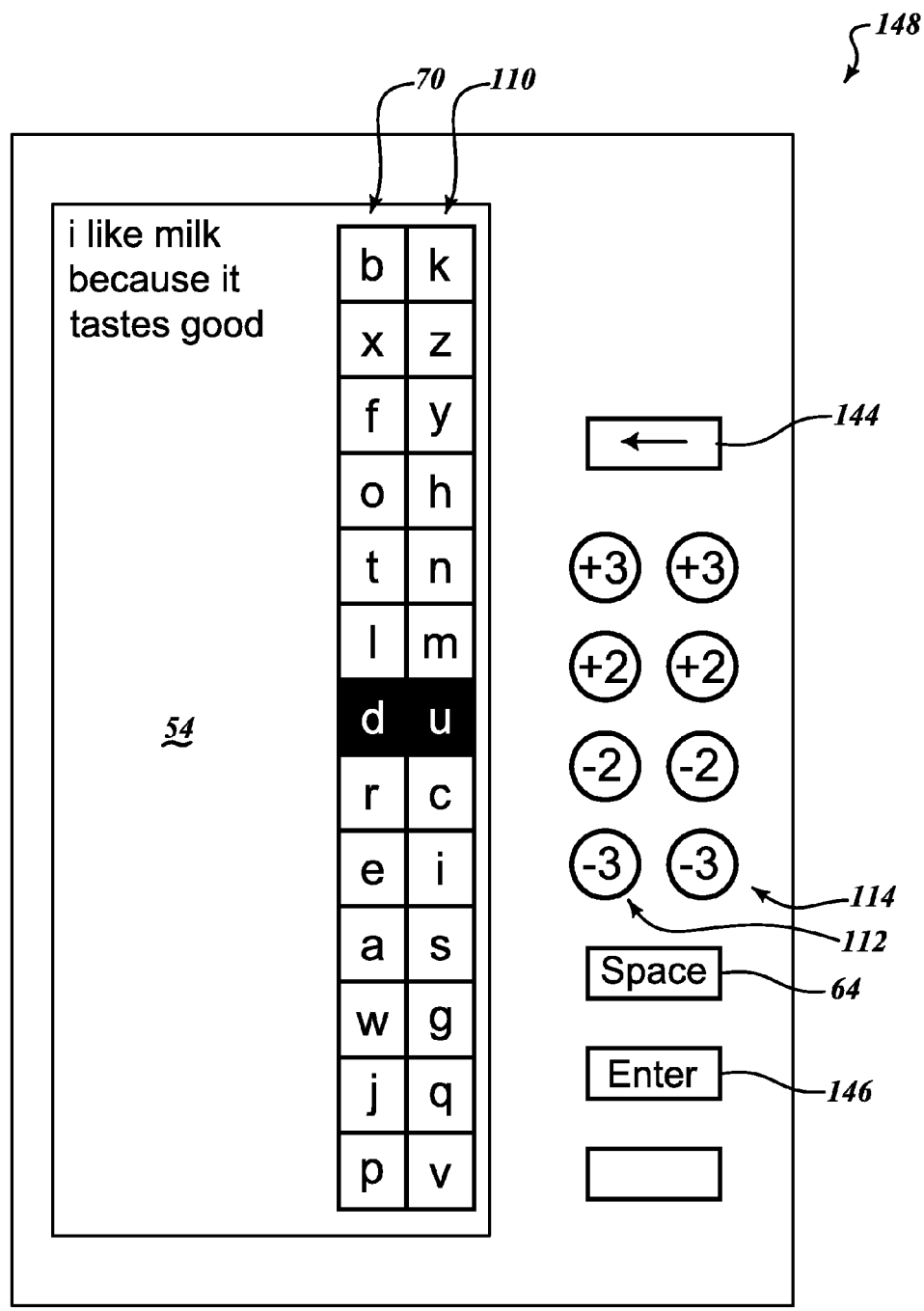

FIG. 32 shows an embodiment of the invention in which the first and second one-dimensional arrays 70, 110 are oriented vertically on the output display 54 of a vertically-operated electronic device 148 and the plurality of selection buttons 112, 114 are arranged in columns alongside the one-dimensional arrays. In one embodiment the selection buttons 112, 114 are hard keys, but in an alternative embodiment the buttons are soft keys shown on the output display 54. The embodiment further includes the Backspace key 144, the spacebar 64, and the Enter key 146. The user interface and the method of the vertically-operated electronic device 148 are consistent with that disclosed in FIG. 20 and FIGS. 9 and 10, respectively. This arrangement is conducive to two-finger typing, with the index finger and the middle finger rather than thumbs used to press the selection buttons 112, 114.

Figure 33:
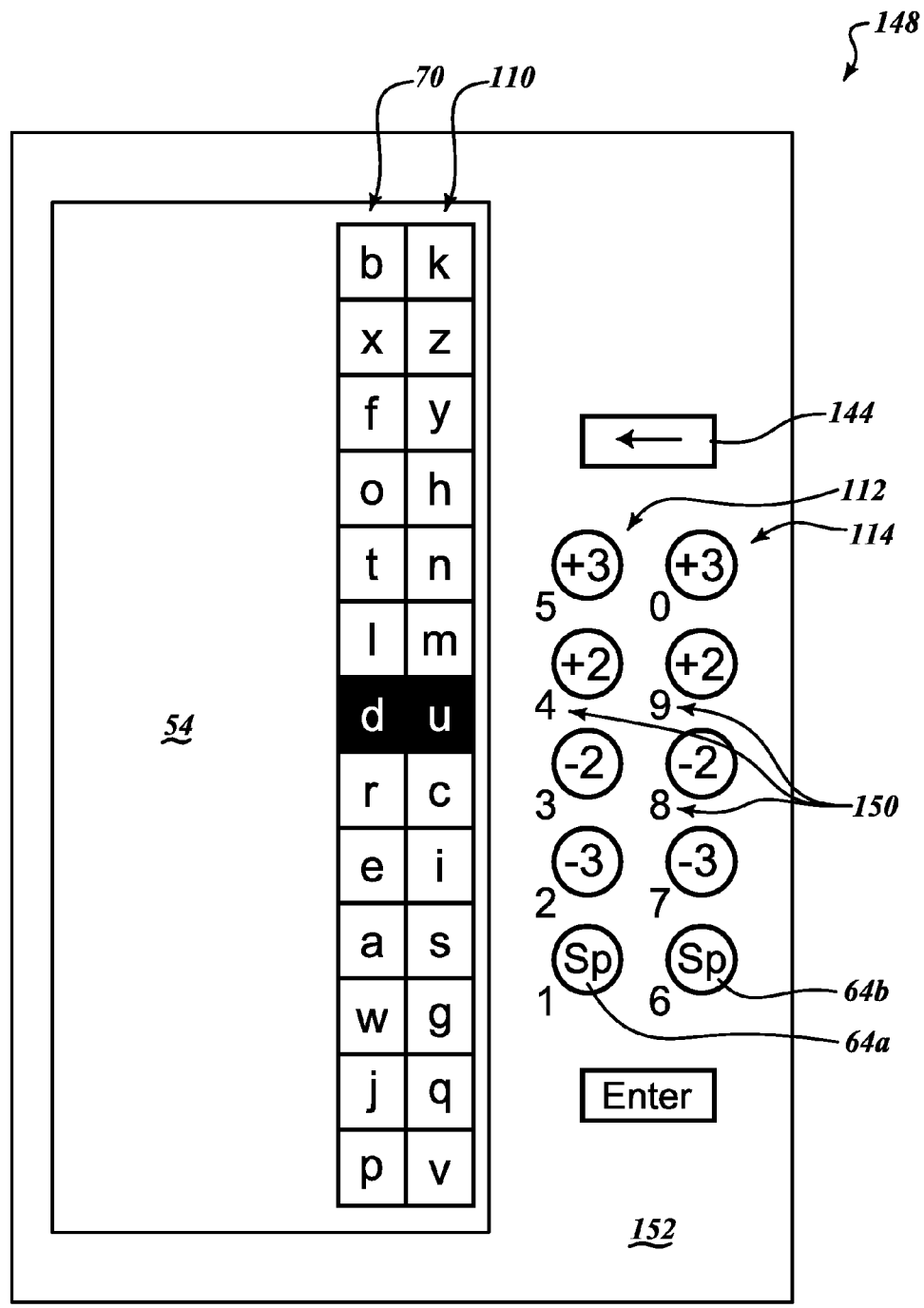

FIG. 33 shows an embodiment of the invention consistent with the vertically-operated electronic device 148 of FIG. 32, except for the function of the spacebar 64. In this embodiment, the spacebar 64 of FIG. 32 is divided into two buttons 64a, 64b. Whenever the device 148 is in a character entry mode, each button 64a, 64b performs the identical function of inputting to the device 148 a space when pressed. However, according to the embodiment of FIG. 33, there is also a numeric entry mode. With the device 148 in numeric entry mode, the plurality of selection keys 112, 114 input a digit from 0 to 9 that is associated with that selection key. This arrangement enables direct entry of digits to the device 148 without relying on the one-dimensional arrays 70, 110. In one embodiment, numeric values 150 are printed on the face 152 of the vertically-operated electronic device 148 alongside each of the selection buttons 112, 114 so that the output display 54 does not need to display a panel of numeric characters. Rather, the user can toggle to the numeric entry mode and then look directly at the characters shown alongside their assigned selection keys 112, 114 on the face 152 of the device.

Figure 34:
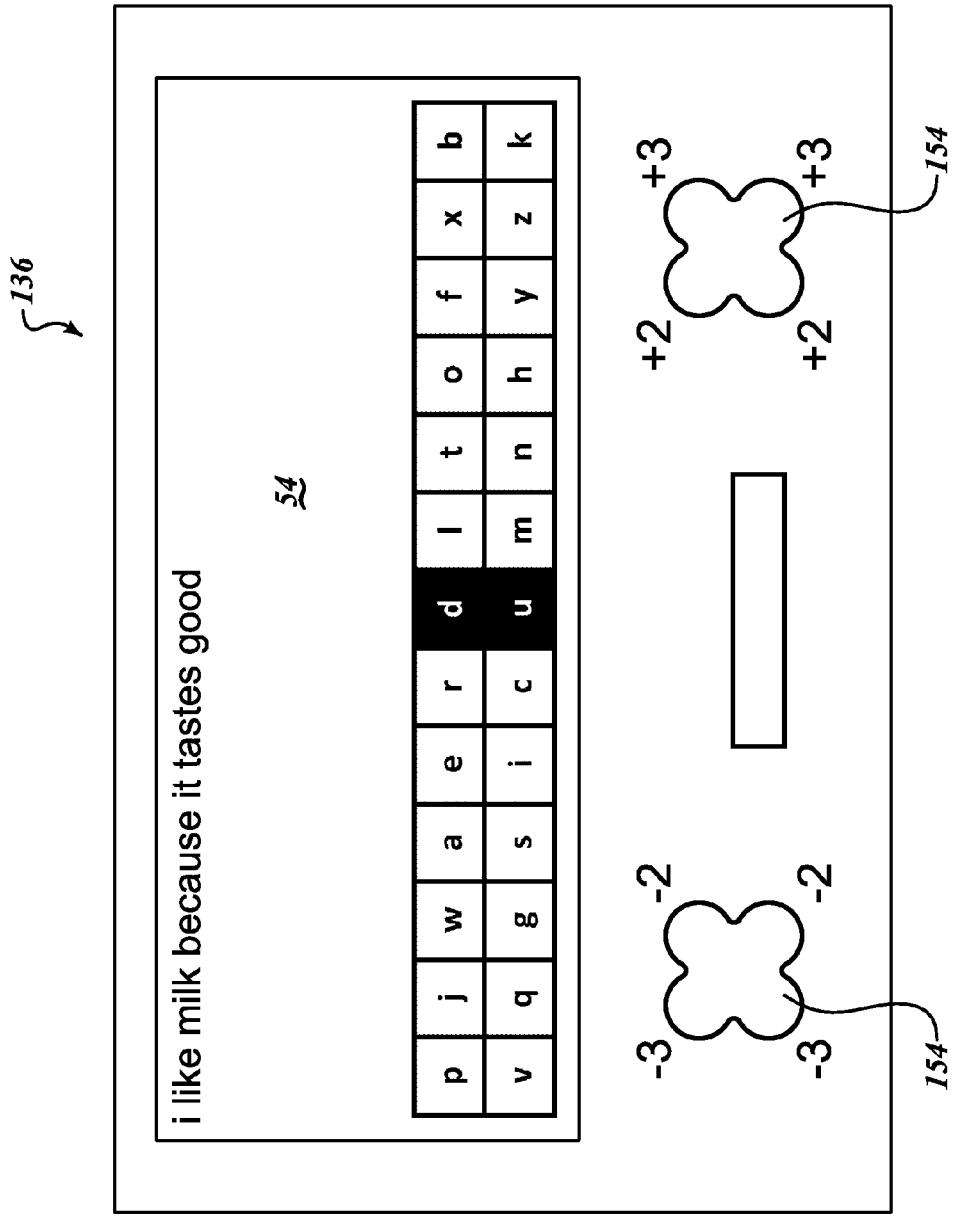

FIG. 34 shows still another embodiment of the invention in which the user interface 50 of FIG. 20 and the distribution 127 of FIG. 26 are applied to an electronic device 136 that is enabled to operate according to at least one of the methods 52, 86 of FIGS. 9 and 10. In the embodiment of FIG. 34, the individual selection buttons 112, 114 of the embodiment of FIG. 29 are combined into two multiple-function game controller-type buttons 154. Each game controller-type button 154 has an integer value assigned to one quadrant of the button 154. By pressing on a given quadrant of the button, the integer value assigned to that quadrant is input. In this embodiment of the electronic device 136, with the user interface of FIG. 20 in effect, only two selection buttons are required because the two selection buttons each can enter one of four different integer values, for a total of eight possible combinations. With two selection buttons of four selection values each, the arrangement provides enough unique selection button combination to specify 26 character positions.

Figure 35:
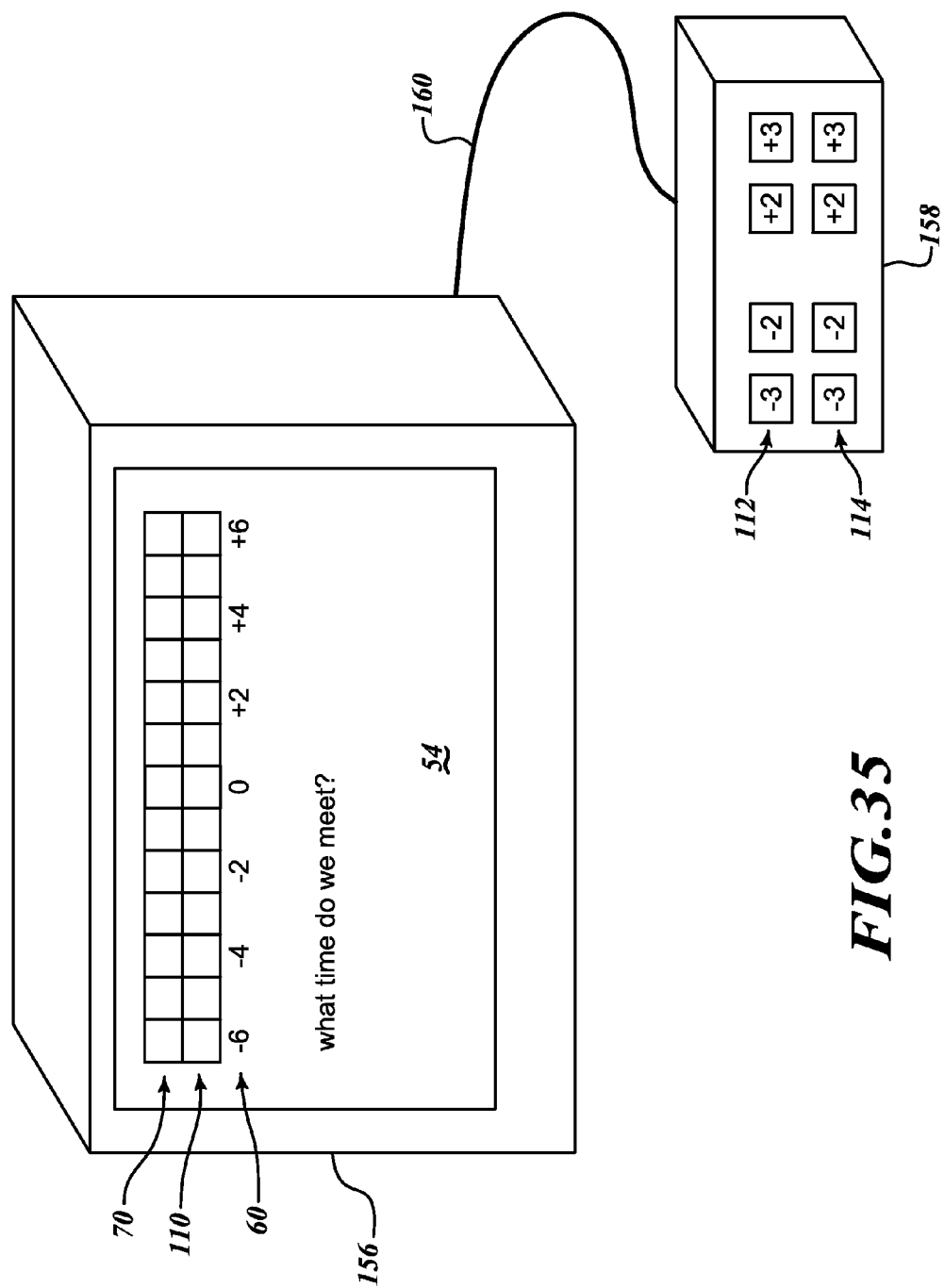

FIG. 35 shows yet another embodiment in which the output display 54 and the plurality of selection keys 112, 114 are remotely located from one another. According to one embodiment, the output display 54 is incorporated in a remotely-operated device 156. Consistent with other embodiments of the invention, the output display 54 displays the first and second one-dimensional arrays 70, 110 and the offset scale 60. A portable controller 158 is communicatively coupled with the output display 54 via a cable 160 connected to the remotely-operated device 156. The remotely-operated controller 158 includes the plurality of selection buttons 112, 114. The remotely-operated device 156 operates according to at least one of the methods of FIGS. 9 and 10.

The various embodiments described above can be combined to provide further embodiments. All of the U.S. patents, U.S. patent application publications, U.S. patent application, foreign patents, foreign patent application and non-patent publications referred to in this specification and/or listed in the Application Data Sheet are incorporated herein by reference, in their entirety.

Aspects of the embodiments can be modified, if necessary to employ concepts of the various patents, application and publications to provide yet further embodiments. These and other changes can be made to the embodiments in light of the above-detailed description.

The invention may be embodied as devices, systems, methods, and/or computer program products. Accordingly, some or all of the invention may be embodied in hardware and/or software, including firmware, resident software, micro-code, etc. The present invention may also take the form of a computer program product on a computer-usable or computer-readable storage medium having computer-usable or computer-readable program code embodied in the medium for use by or in connection with an instruction execution system. In the context of this application, a computer-usable or computer-readable medium may be any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium. By way of example, and not limitation, computer-readable media may comprise computer storage media and communication media.

In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A computer processor-implemented method comprising:

electronically enabling identification of characters arranged within a one-dimensional array, each character identified by an integer value equal to how many positions the character is offset from a reference position of the one-dimensional array; and electronically enabling selection of any of the characters arranged within the one-dimensional array by receiving input resulting from one or two activations of one selection key, or activation of a pair of selection keys, the activation of the one or pair of selection keys specifying the integer value that identifies a selected character, wherein each selection key has an assigned integer value, and the integer value that identifies the selected character is calculated by a computer processor by summing the assigned integer values of each activated selection key for each instance that each selection key is activated within a selectable-length time period.

2. The method of claim 1 further comprising electronically displaying the at least four unique characters arranged in a one-dimensional array on a display of a device.

3. The method of claim 1 wherein the selectable-length time period is selectable by a user of the device.

4. The method of claim 1 wherein the one-dimensional array has thirteen characters and the received input results from activation of at least one of four selection keys.

5. The method of claim 4 wherein the assigned integer values of the four selection keys are −3, −2, +2, and +3.

6. The method of claim 4 wherein the assigned integer values of the four selection keys are −3, −1, +1, and +3.

7. The method of claim 1 wherein the at least four unique characters are distributed amongst two or more one-dimensional arrays of at least four unique characters each, each array having an associated set of selection keys.

8. The method of claim 1 wherein the at least four unique characters are twenty-six characters distributed amongst two one-dimensional arrays of thirteen characters each.

9. The method of claim 1 wherein the at least four unique characters of the one-dimensional array are arranged according to frequency of use and relative speed of selection key keystroke combinations relative to other selection key keystroke combinations.

10. The method of claim 9 wherein more frequently used characters are in positions of the one-dimensional array associated with faster selection key keystroke combinations and less frequently used characters are in positions of the one-dimensional array associated with slower selection key keystroke combinations.

11. The method of claim 1, further comprising automatically displaying the selected character on a display of the device.

12. The method of claim 1, further comprising electronically enabling successive identification and selection of the at least four unique characters over a series of selectable-length time periods.

13. The method of claim 1 wherein each selection key has an assigned integer value, and the integer value that identifies the selected character is calculated by a computer processor by multiplying the assigned integer values of each activated selection key for each instance that each selection key is activated within a selectable-length time period.

14. The method of claim 13 wherein the at least four unique characters are eight characters, the received input results from activation of at least one of three selection keys, and the assigned integer values of the three selection keys are +2, +3, and +5.

15. The method of claim 13 wherein the at least four unique characters are eighteen characters, the received input results from activation of at least one of four selection keys, and the assigned integer values of the four selection keys are −1, +2, +3, and +5.

16. The method of claim 13 wherein the at least four unique characters are twenty characters, the received input results from activation of at least one of five selection keys, and the assigned integer values of the five selection keys are −1, +2, +3, +5 and +7.

17. An electronic apparatus comprising:
a case having a display;
a plurality of selection keys arranged on a front face of the case or the display, each selection key having an assigned integer value, the each selection key having an assigned integer value enables selection, using the apparatus, of one or more characters arranged within a one-dimensional array by one activation of one selection key, enables selection of one or more of the characters arranged within the one-dimensional array by two activations of one selection key, and enables selection of one or more of the characters arranged within the one-dimensional array by activation of a pair of selection keys of the plurality of selection keys, each character identified by how many positions the character is offset from a reference of the one-dimensional array; and
a processor inside the case, the display and the plurality of selection keys communicatively coupled to the processor.

18. The electronic apparatus of claim 17, further comprising two or more one-dimensional arrays of at least four unique characters each displayed on the front face of the case or the display, each of the plurality of selection keys associated with one of the two or more one-dimensional arrays.

19. The electronic apparatus of claim 18 wherein each of the plurality of selection keys is oriented along an axis that lies lengthwise with the one-dimensional array of characters with which each selection key is associated.

20. The electronic apparatus of claim 18 further comprising:
a reference feature located on or near at least one of the two or more one-dimensional arrays; and
a scale oriented parallel to at least one of the two or more one-dimensional arrays and that includes a value of zero corresponding to the reference feature.

21. The electronic apparatus of claim 18 wherein the two or more one-dimensional arrays of at least four unique characters each are two one-dimensional arrays of thirteen characters each and the number of selection keys associated with each one-dimensional array is four.

22. The electronic apparatus of claim 21 wherein the assigned integer values of the four selection keys are −3, −2, +2, and +3.

23. The electronic apparatus of claim 21 wherein the assigned integer values of the four selection keys are −3, −1, +1, and +3.

24. The electronic apparatus of claim 17 wherein two or more of the selection keys associated with a one-dimensional array are combined into one multiple-function button.

25. The electronic apparatus of claim 17 wherein the display and the plurality of selection keys are located remotely from one another.

26. A computer readable storage medium having computer executable instructions thereon for performing the following, wherein the computer readable storage medium is non-transitory:
electronically enabling identification of characters arranged within a one-dimensional array, each character identified by an integer value equal to how many positions the character is offset from a reference position of the one-dimensional array; and
electronically enabling selection of any of the characters arranged within the one-dimensional array by receiving input resulting from one or two activations of one selection key, or activation of a pair of selection keys, the activation of the one or pair of selection keys specifying the integer value that identifies a selected character, wherein each selection key has an assigned integer value, and the integer value that identifies the selected character is calculated by a computer processor by summing the assigned integer values of each activated selection key for each instance that each selection key is activated within a selectable-length time period.

27. The computer readable storage medium of claim 26 wherein the selectable-length time period is selectable by a user of a device configured to use the computer readable storage medium.

28. The computer readable storage medium of claim 26 wherein the at least four unique characters of the one-dimensional array are arranged according to frequency of use and relative speed of selection key keystroke combinations relative to other selection key keystroke combinations.

* * * * *